W. P. SHATTUCK.
ADDING AND LISTING MACHINE.
APPLICATION FILED JAN. 3, 1905. RENEWED MAR. 27, 1911.

1,007,740.

Patented Nov. 7, 1911.

21 SHEETS—SHEET 6.

WITNESSES

INVENTOR
WILLIAM P. SHATTUCK
BY
Paul & Paul
HIS ATTORNEYS

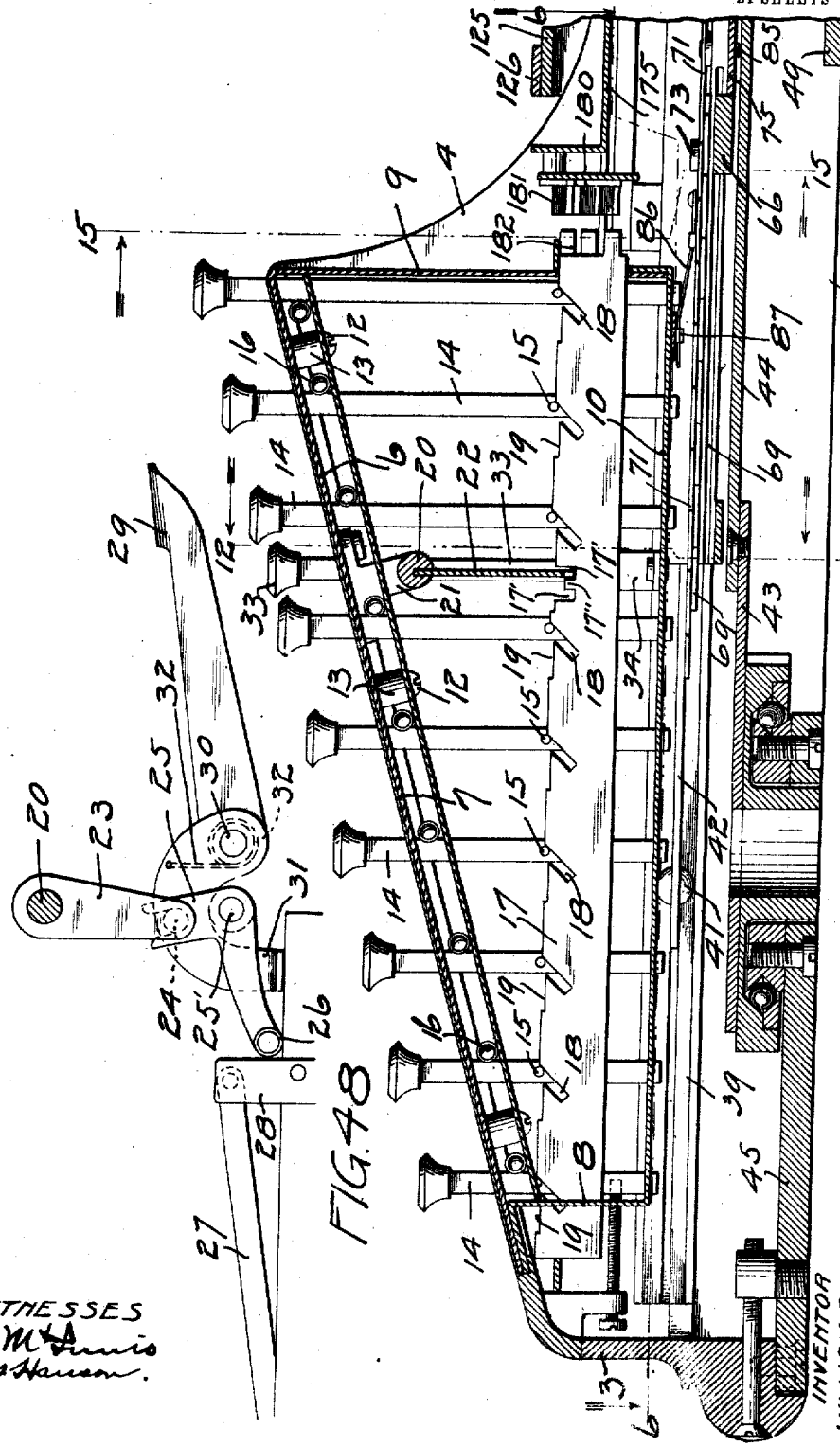

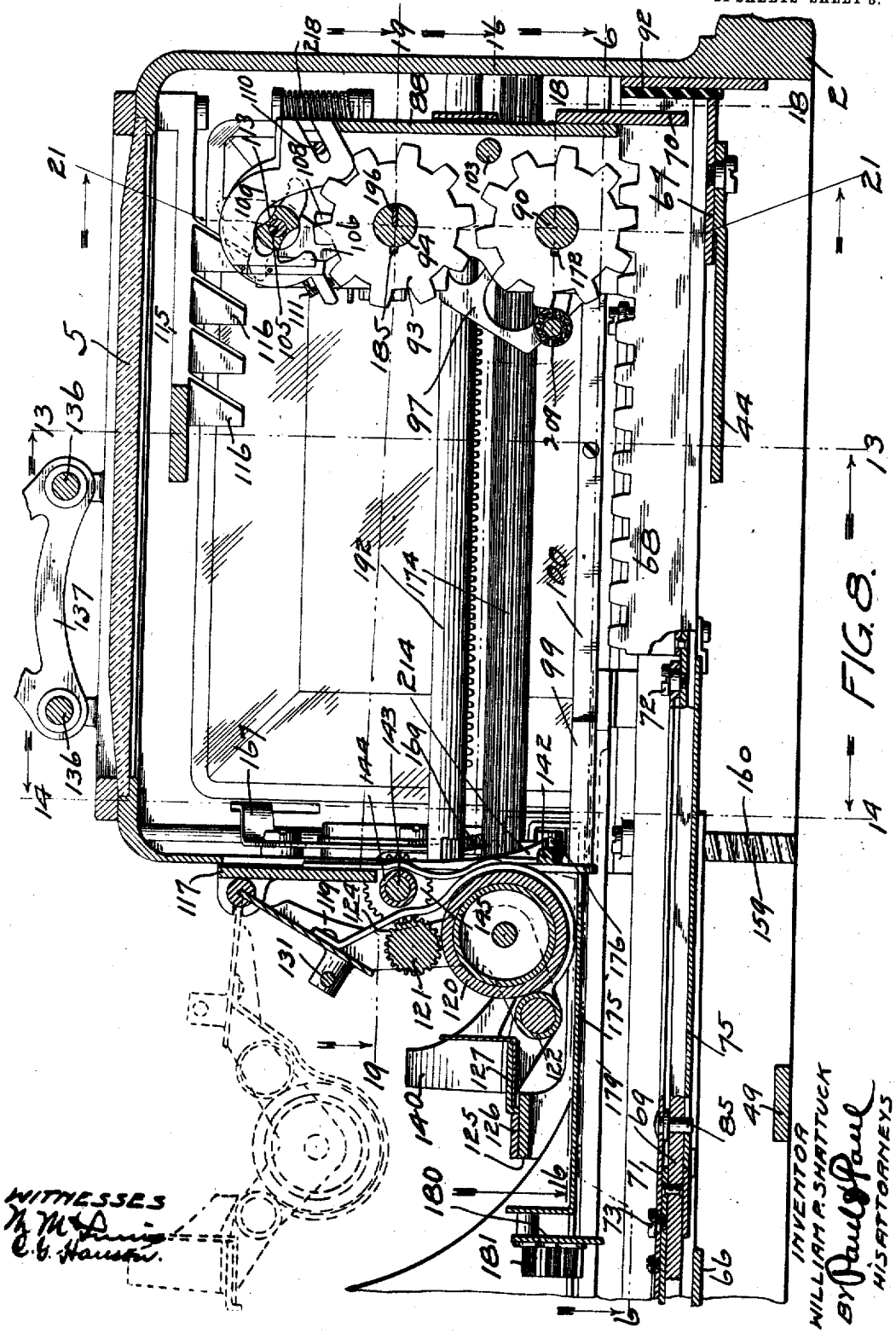

W. P. SHATTUCK.
ADDING AND LISTING MACHINE.
APPLICATION FILED JAN. 3, 1905. RENEWED MAR. 27, 1911.
1,007,740.
Patented Nov. 7, 1911.
21 SHEETS—SHEET 9.
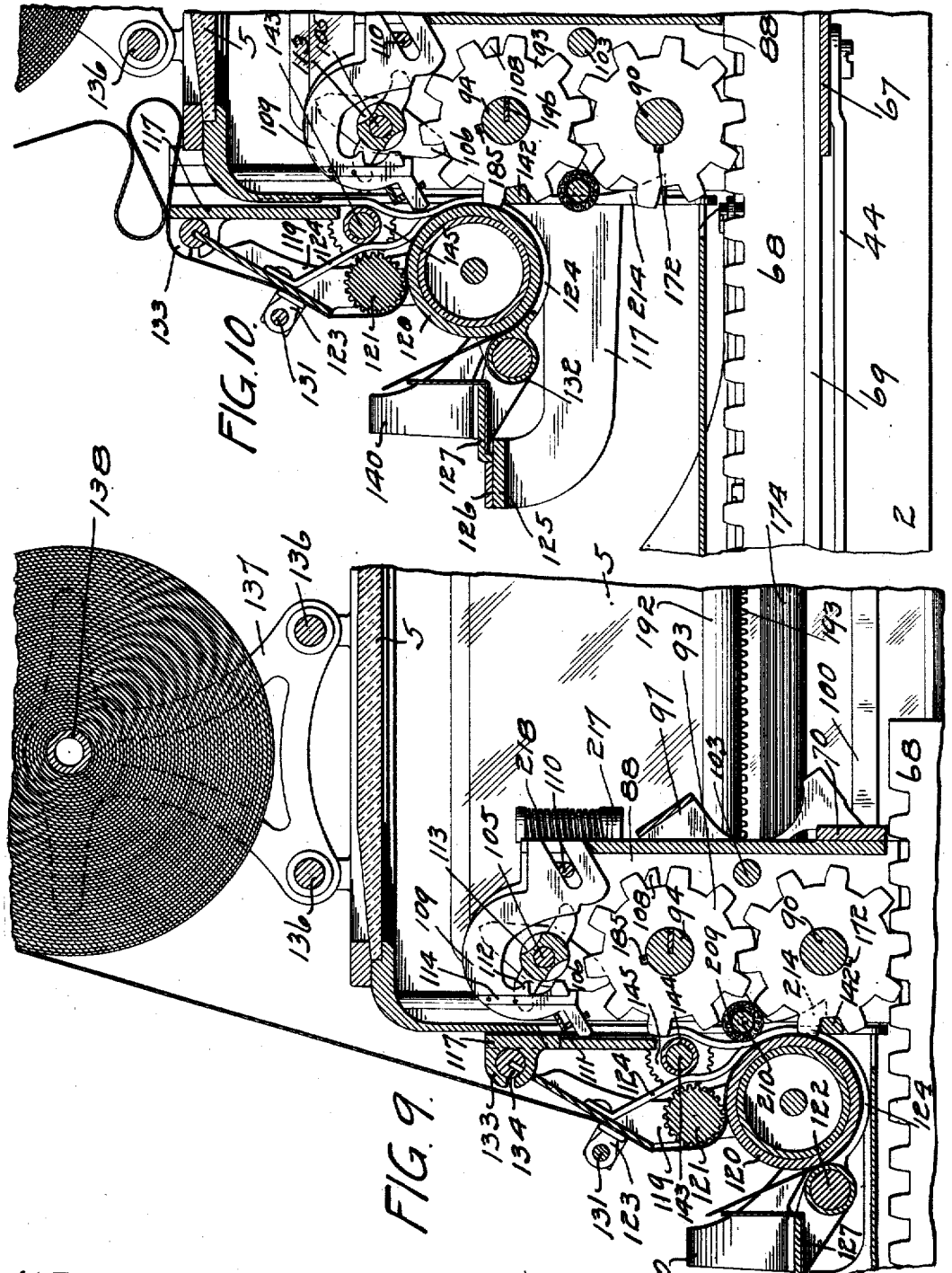
WITNESSES
INVENTOR
WILLIAM P. SHATTUCK
BY Paul & Paul
HIS ATTORNEYS

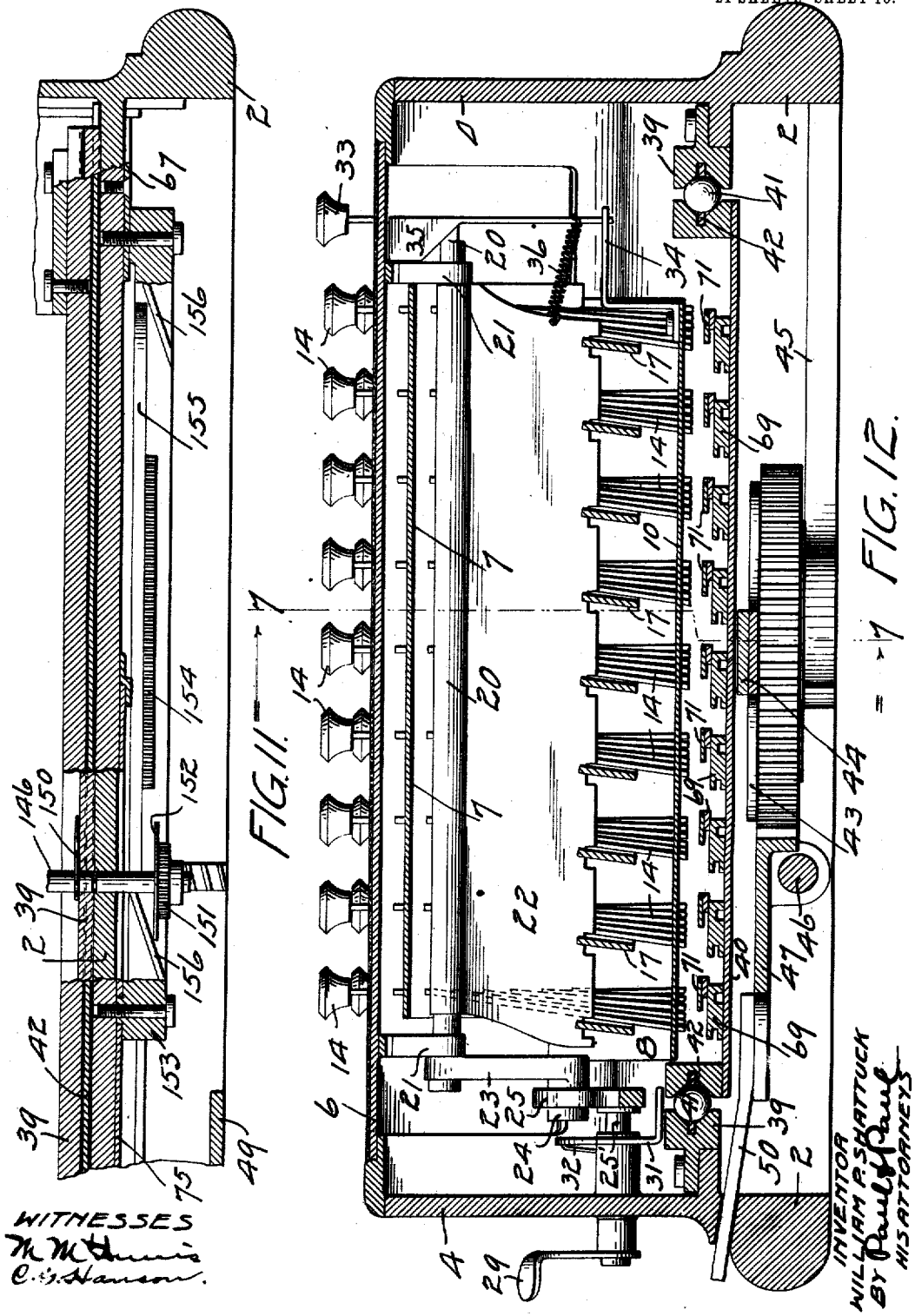

W. P. SHATTUCK.
ADDING AND LISTING MACHINE.
APPLICATION FILED JAN. 3, 1905. RENEWED MAR. 27, 1911.

1,007,740.

Patented Nov. 7, 1911.
21 SHEETS—SHEET 11.

INVENTOR
WILLIAM P. SHATTUCK

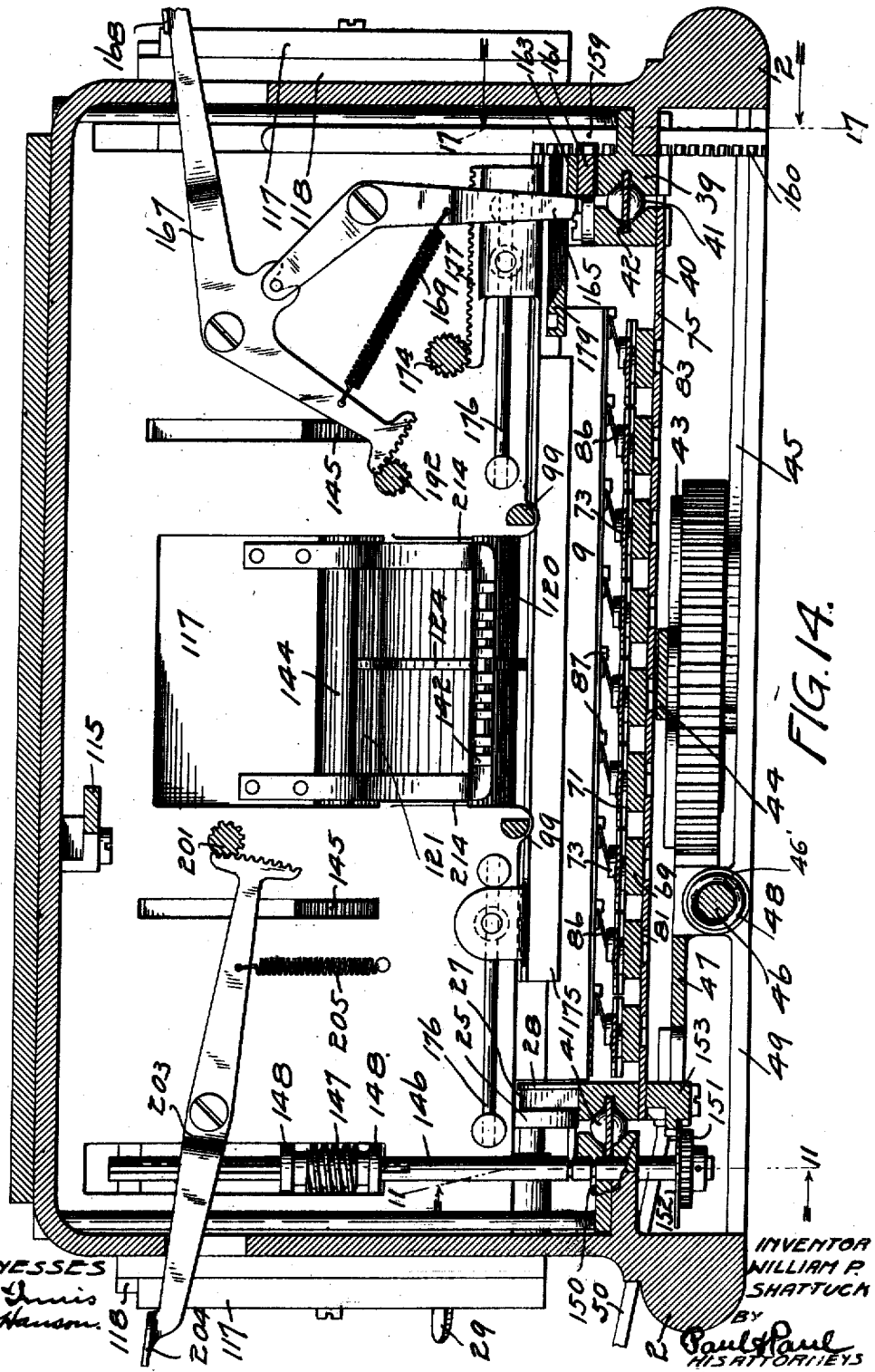

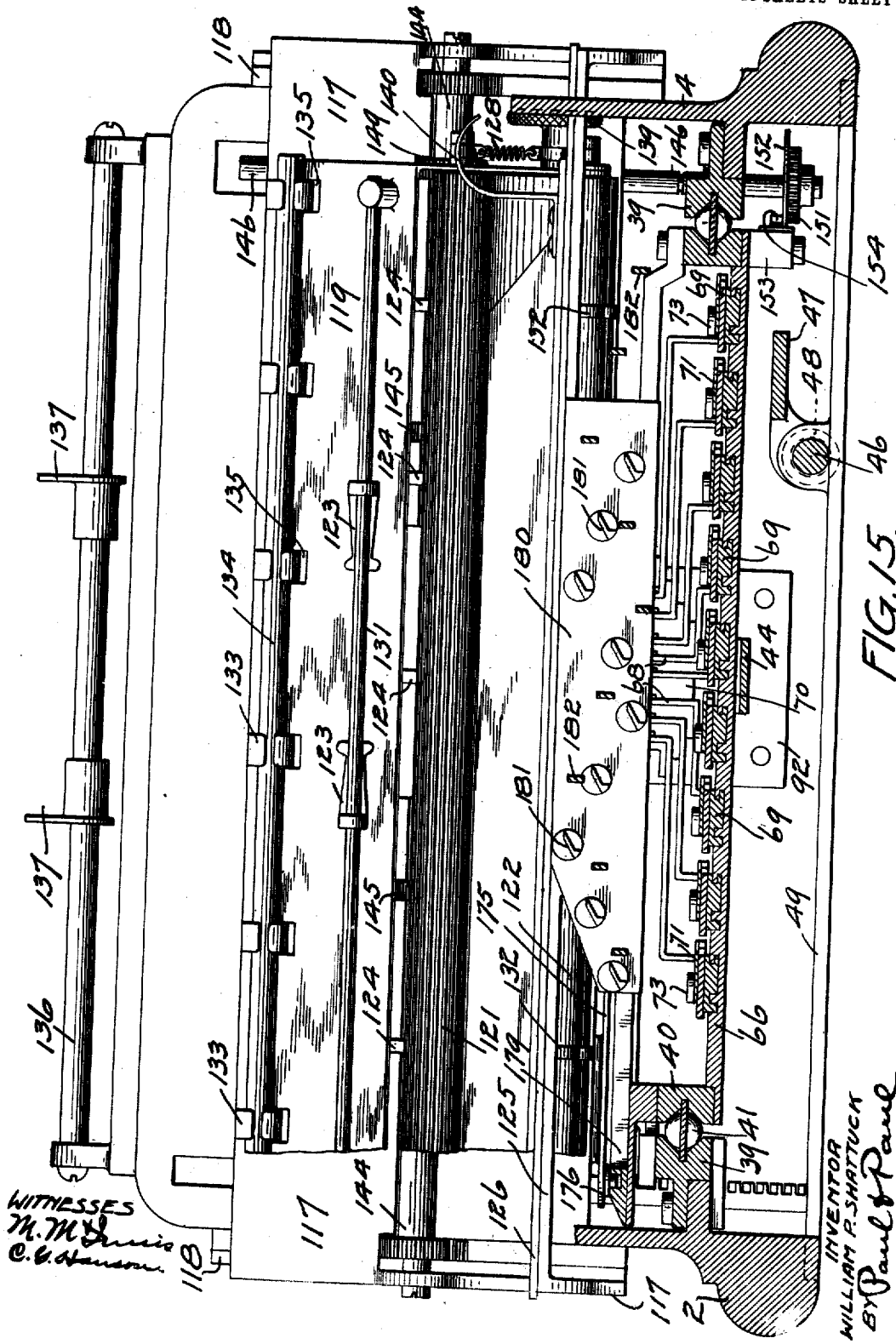

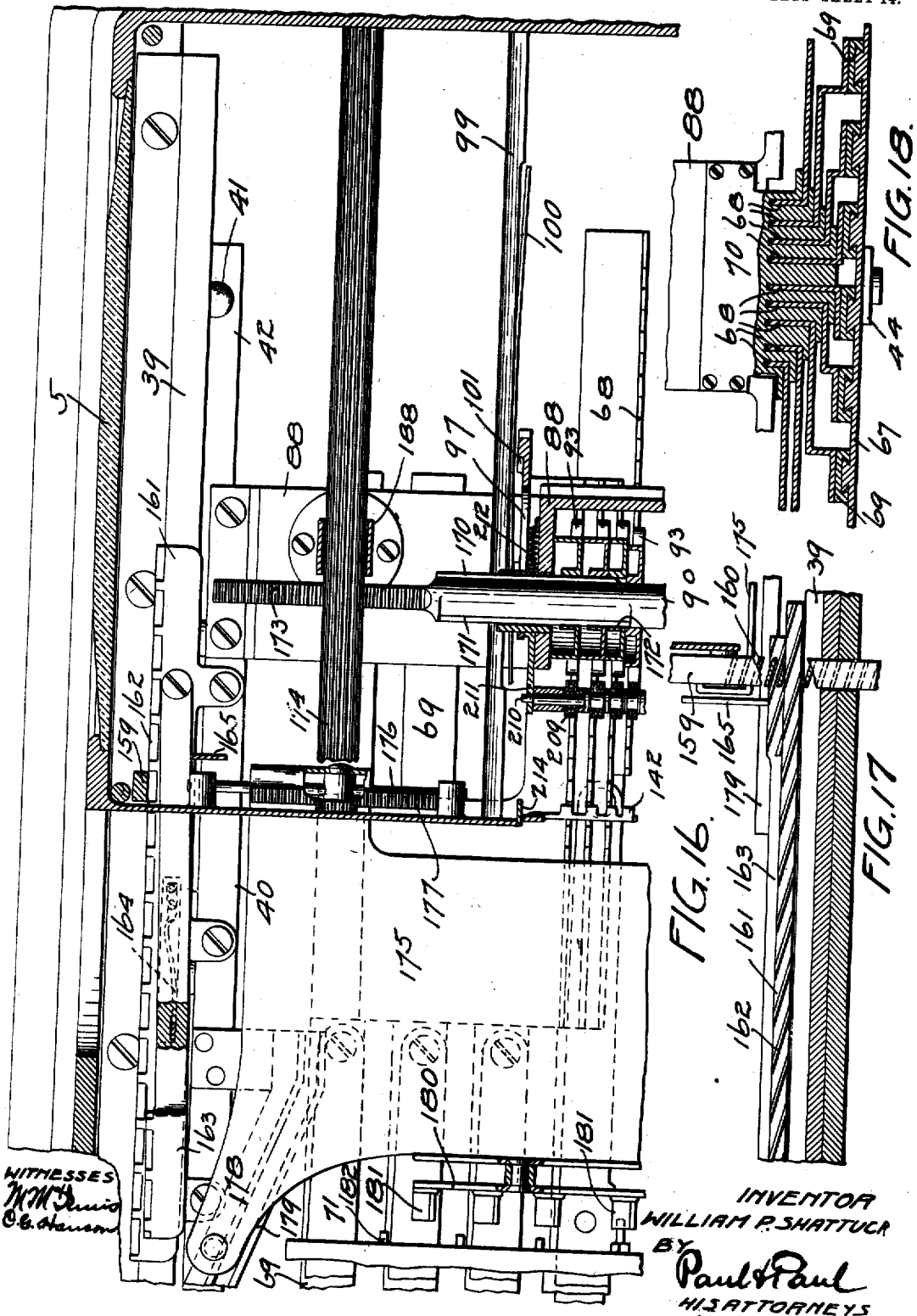

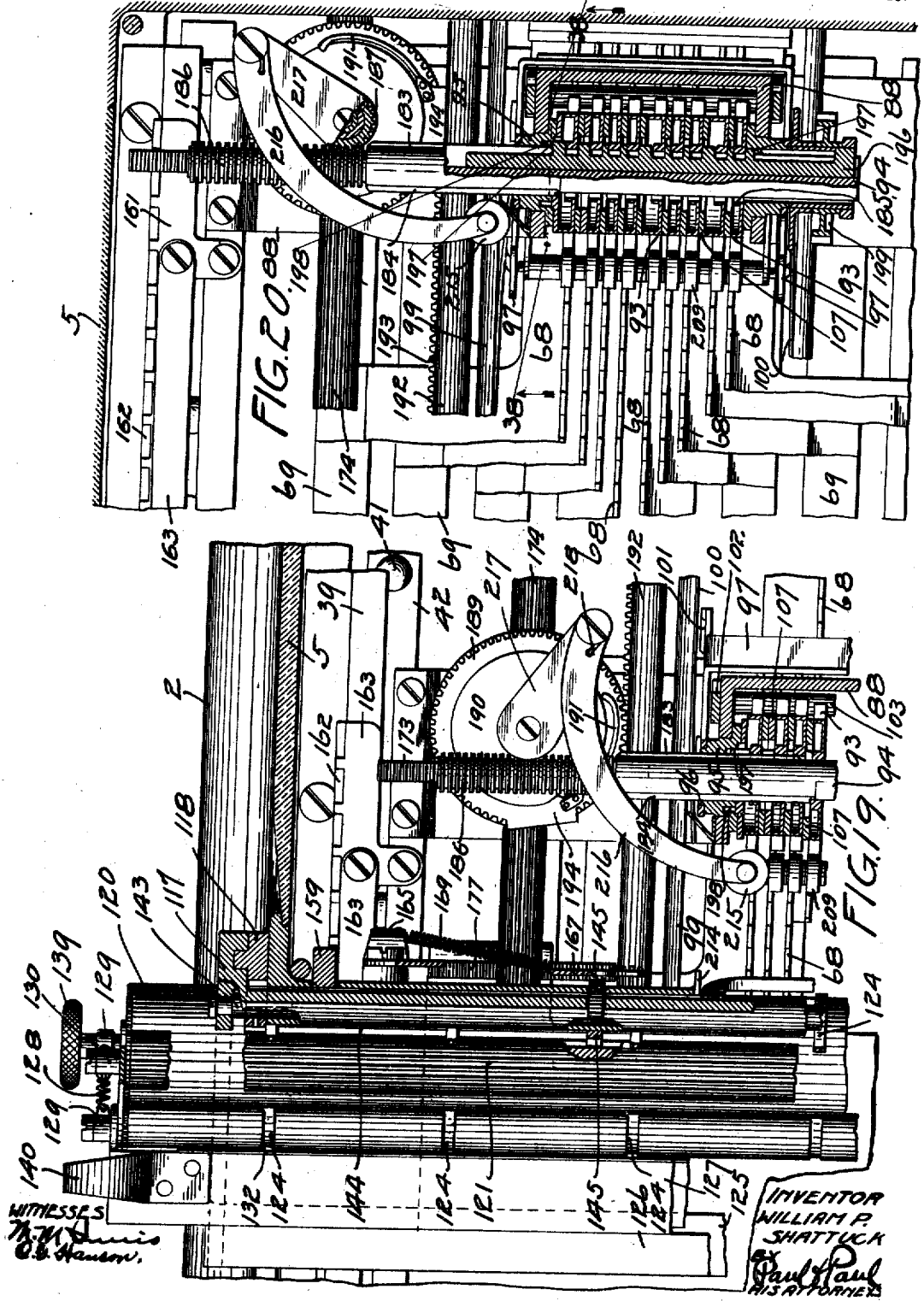

W. P. SHATTUCK.
ADDING AND LISTING MACHINE.
APPLICATION FILED JAN. 3, 1905. RENEWED MAR. 27, 1911.
1,007,740.
Patented Nov. 7, 1911.
21 SHEETS—SHEET 16.
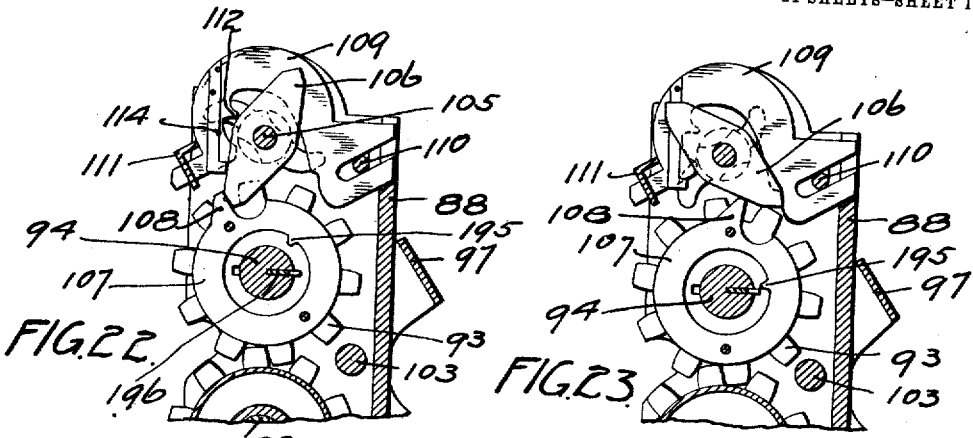
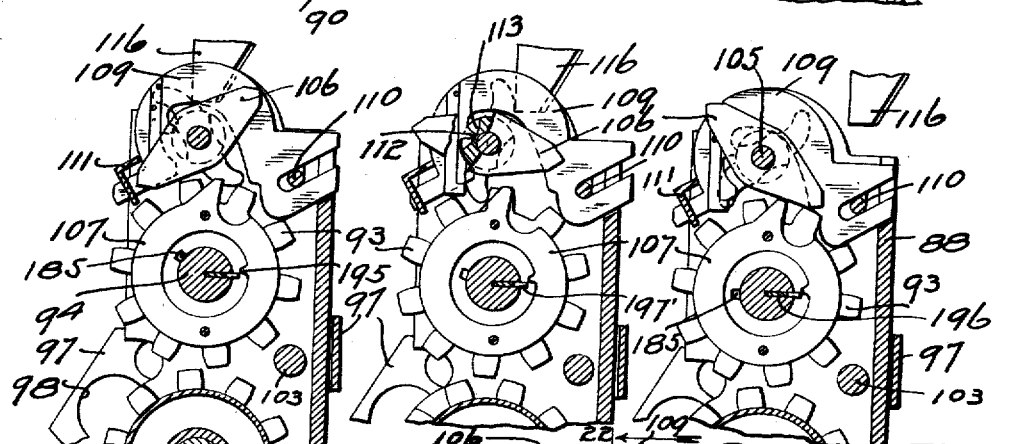
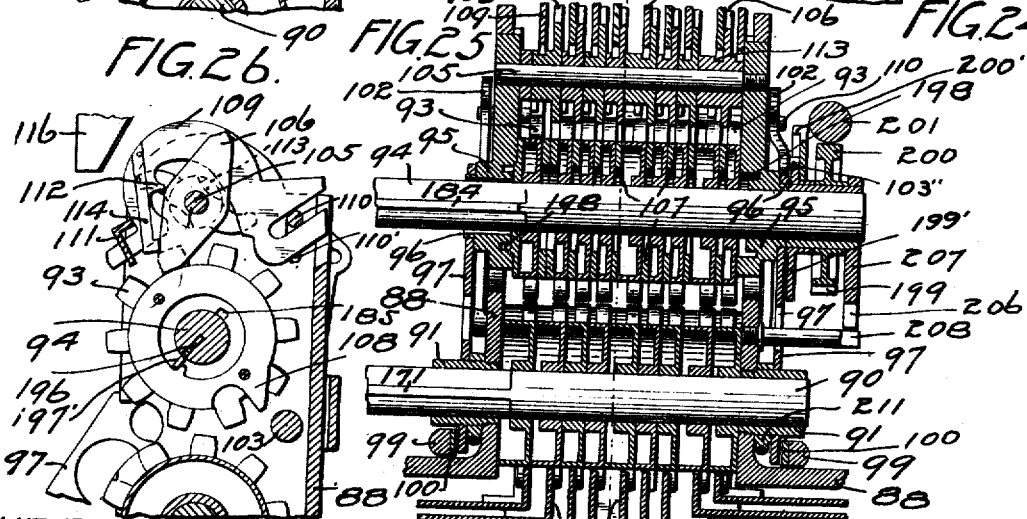

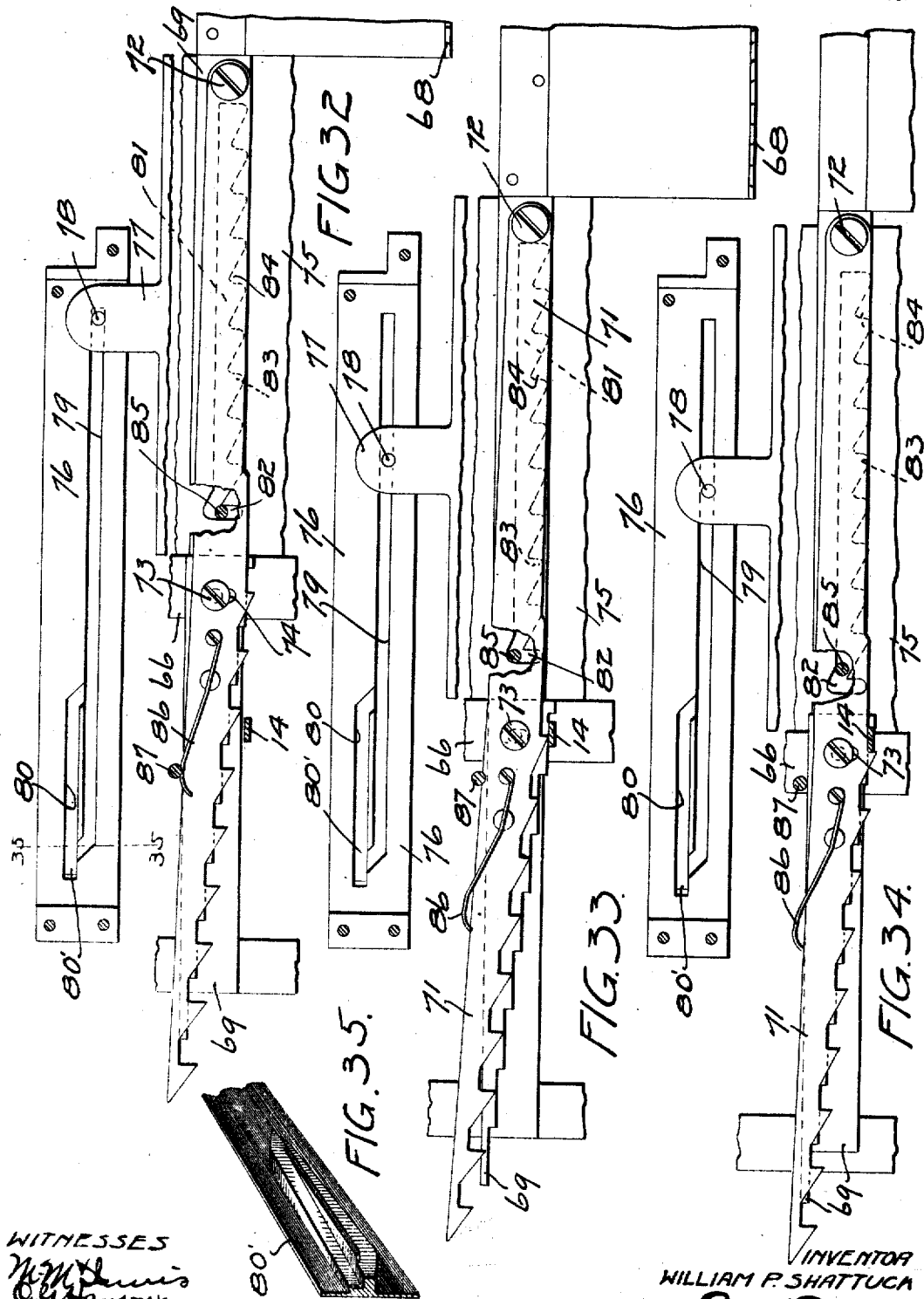

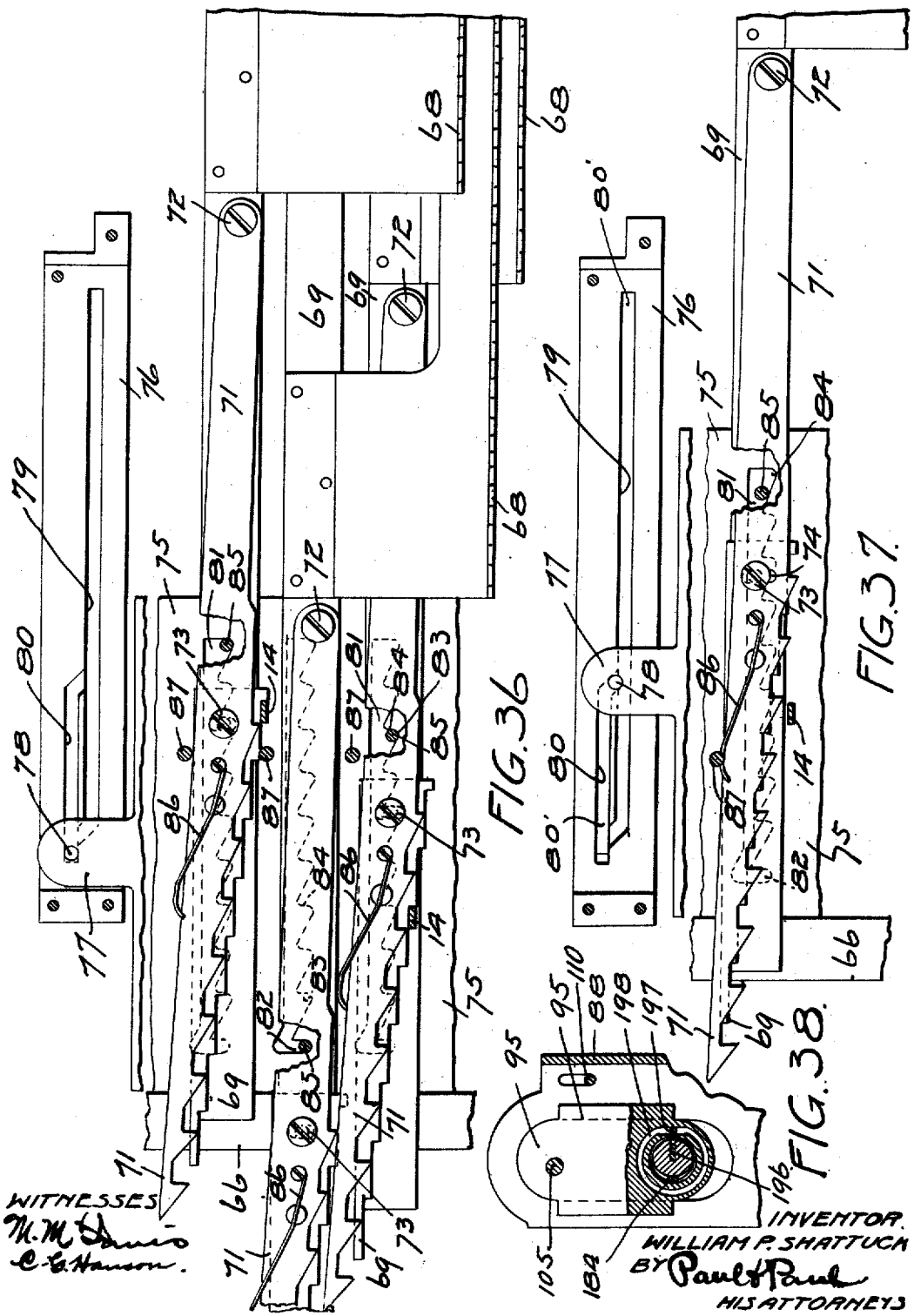

W. P. SHATTUCK.
ADDING AND LISTING MACHINE.
APPLICATION FILED JAN. 3, 1905. RENEWED MAR. 27, 1911.
1,007,740.
Patented Nov. 7, 1911.
21 SHEETS—SHEET 20.
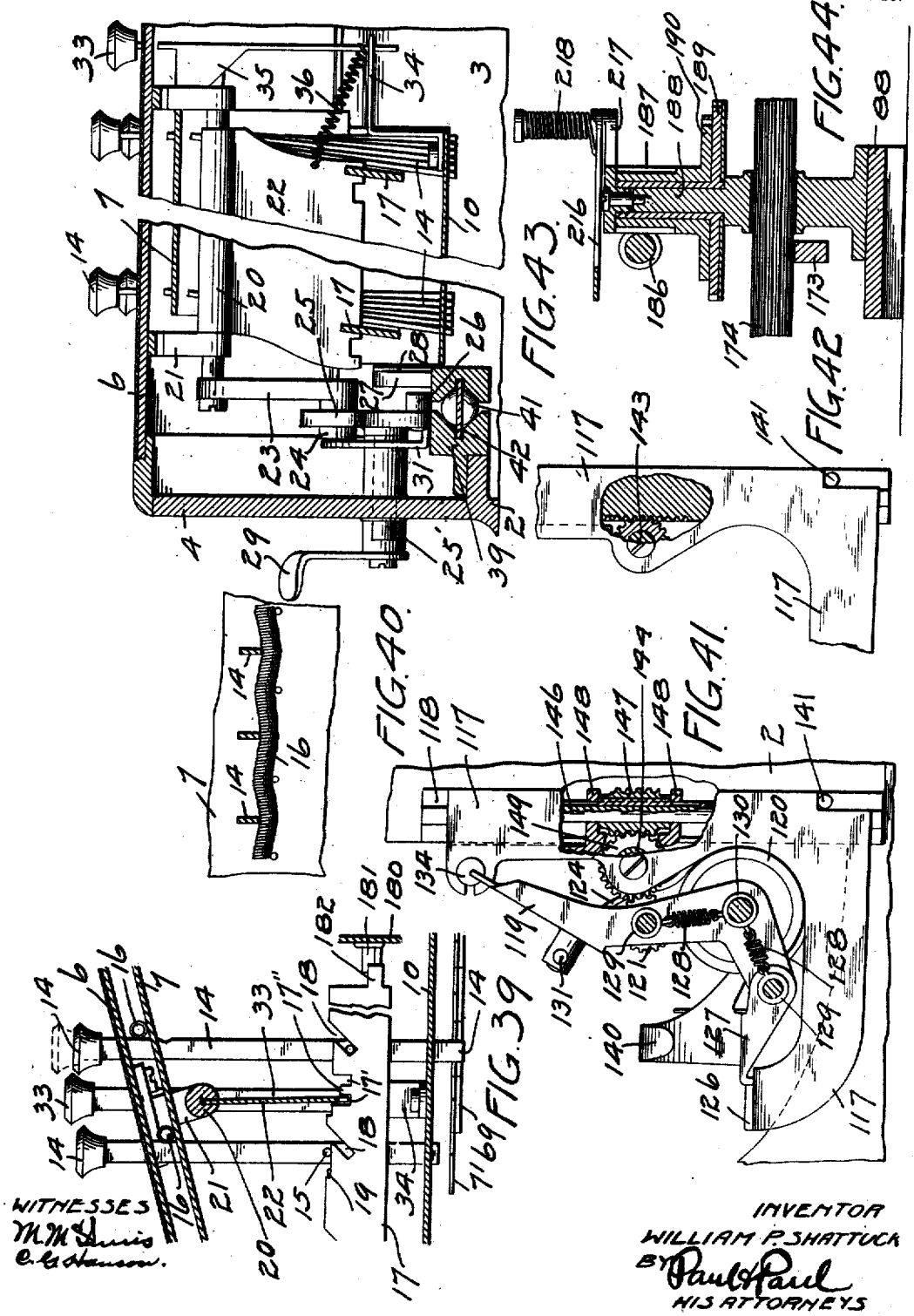
WITNESSES
INVENTOR
WILLIAM P. SHATTUCK
BY Paul & Paul
HIS ATTORNEYS

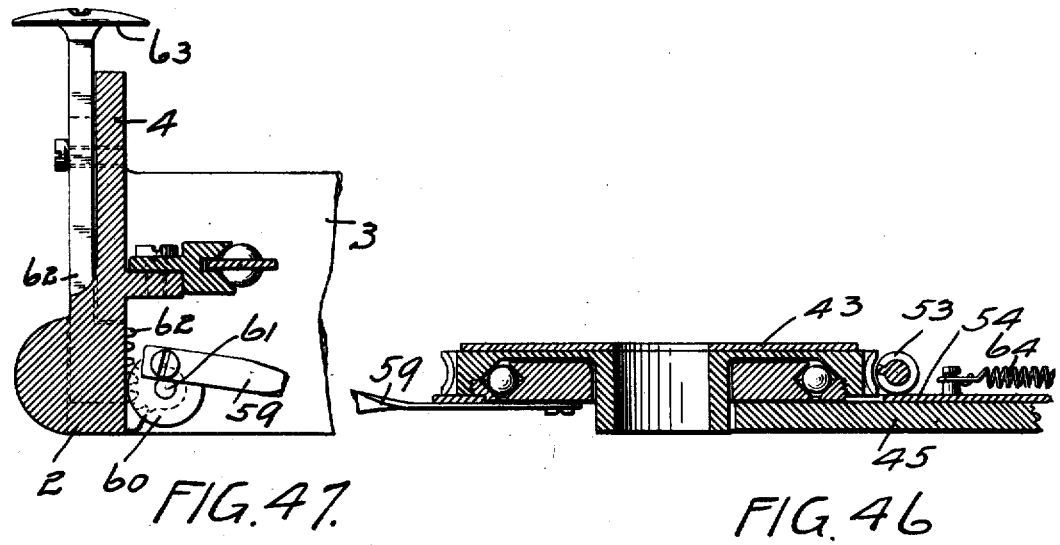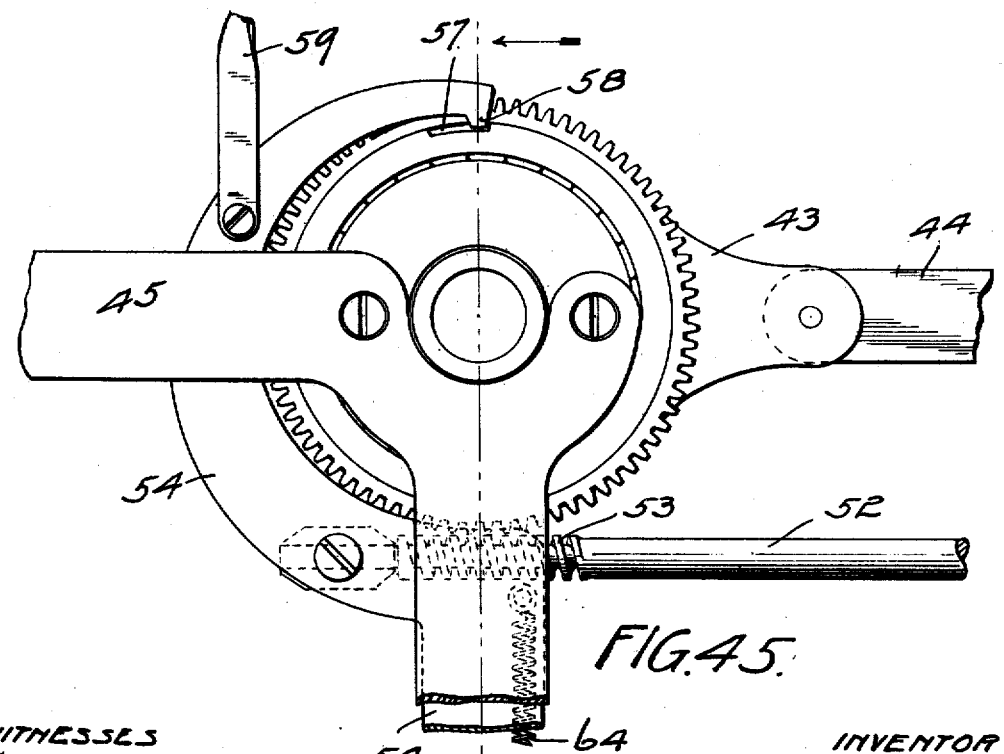

UNITED STATES PATENT OFFICE.

WILLIAM P. SHATTUCK, OF MINNEAPOLIS, MINNESOTA, ASSIGNOR TO SHATTUCK ADDING MACHINE COMPANY, OF MINNEAPOLIS, MINNESOTA, A CORPORATION OF MINNESOTA.

ADDING AND LISTING MACHINE.

1,007,740.      Specification of Letters Patent.      Patented Nov. 7, 1911.

Application filed January 3, 1905, Serial No. 239,484. Renewed March 27, 1911. Serial No. 617,235.

*To all whom it may concern:*

Be it known that I, WILLIAM P. SHATTUCK, of Minneapolis, Hennepin county, Minnesota, have invented certain new and useful Improvements in Adding and Listing Machines, of which the following is a specification.

This invention relates particularly to improvements in machines designed for making lists of checks or other items, adding the items and printing the totals thereof.

The objects I have in view are to provide a machine having a positive adding mechanism of simple and durable construction, capable of printing each item on a strip or sheet of paper and of printing the totals or sum of such items on the same strip or sheet either in like or in a contrasting color.

The invention consists generally in the constructions and combinations hereinafter described and particularly pointed out in the claims.

My present invention is an improvement on the machine shown, described and claimed in Letters Patent of the United States issued to me April 10, 1900, No. 647238.

Figure 1:
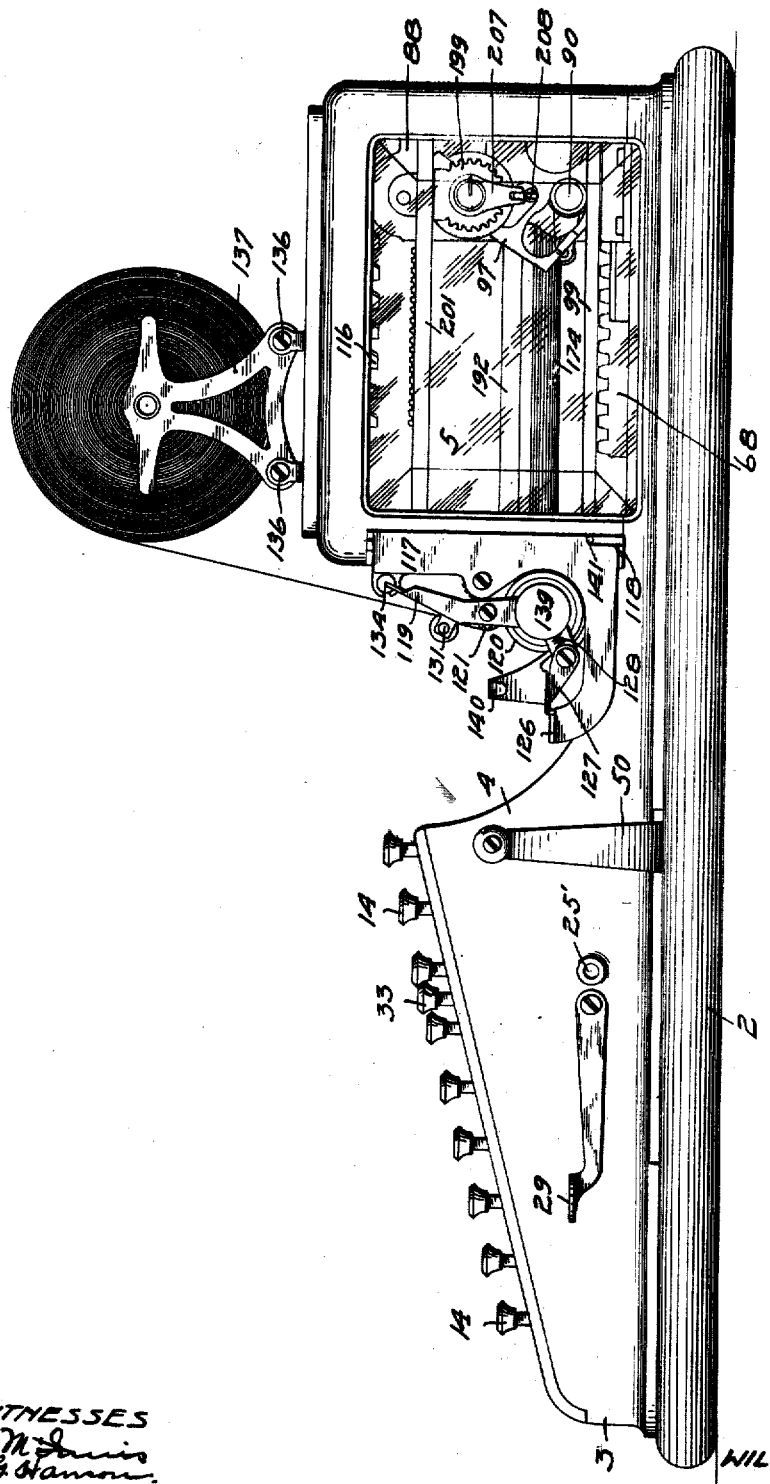
Figure 2:
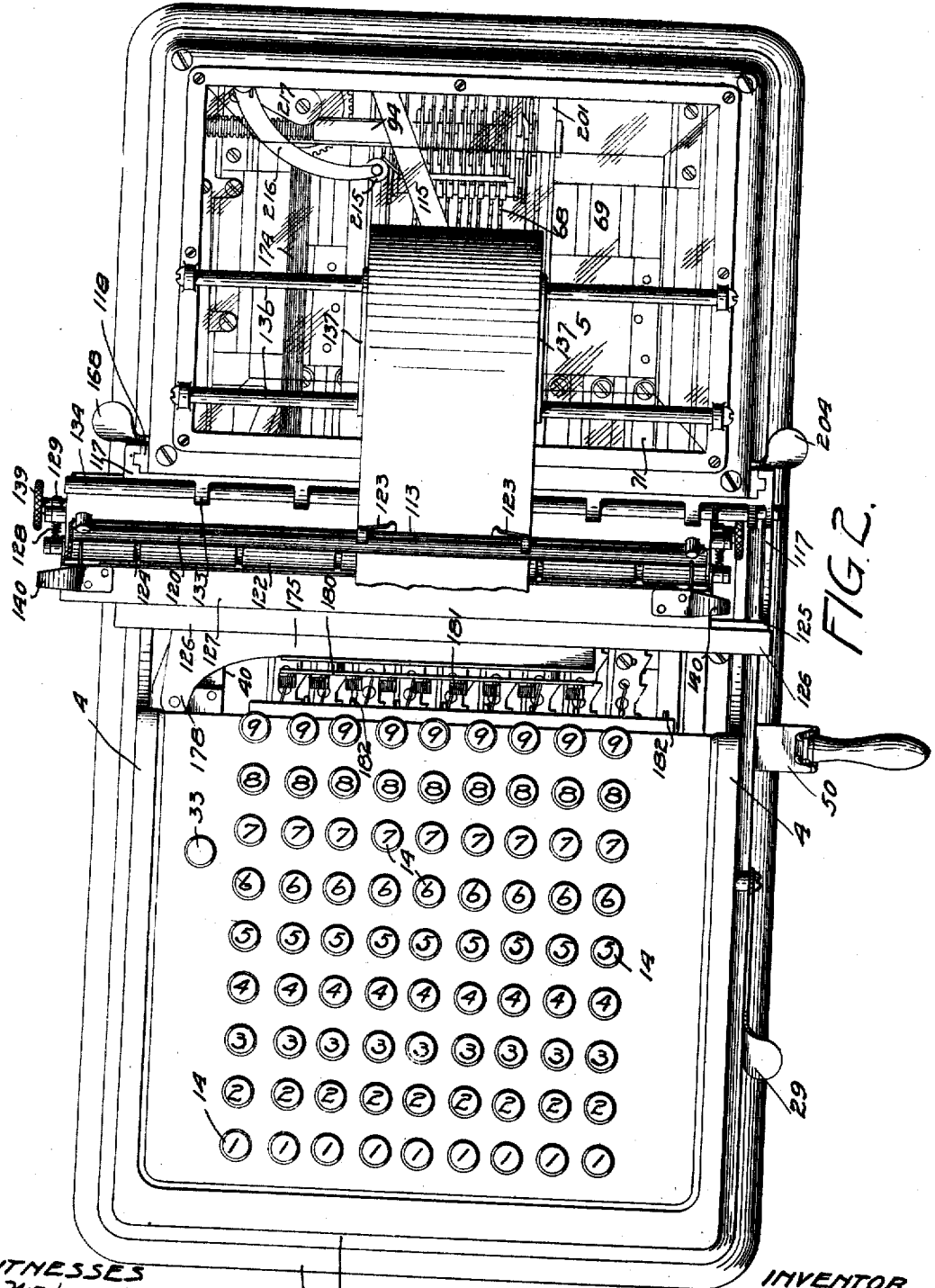
Figure 3:
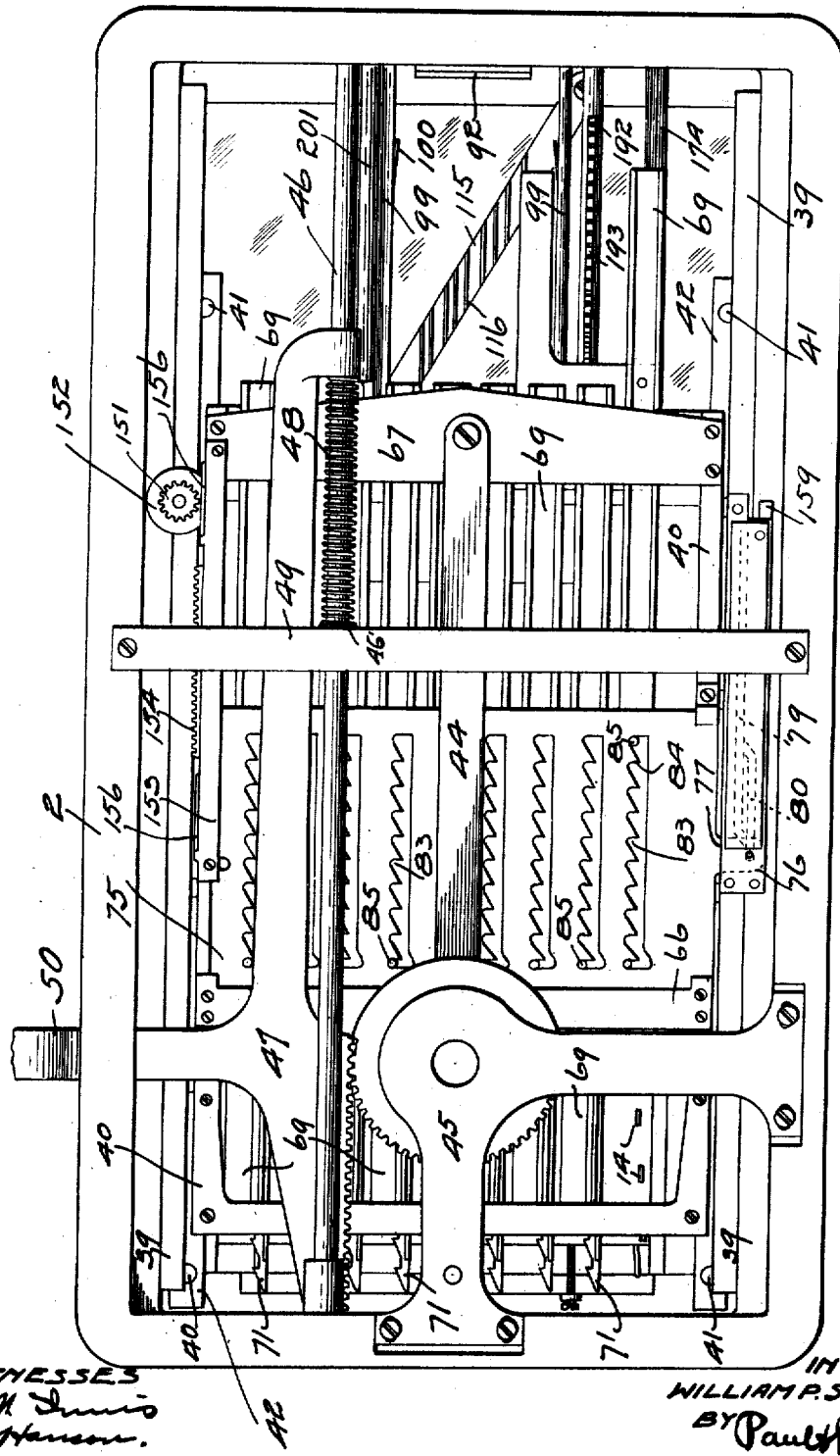
Figure 4:
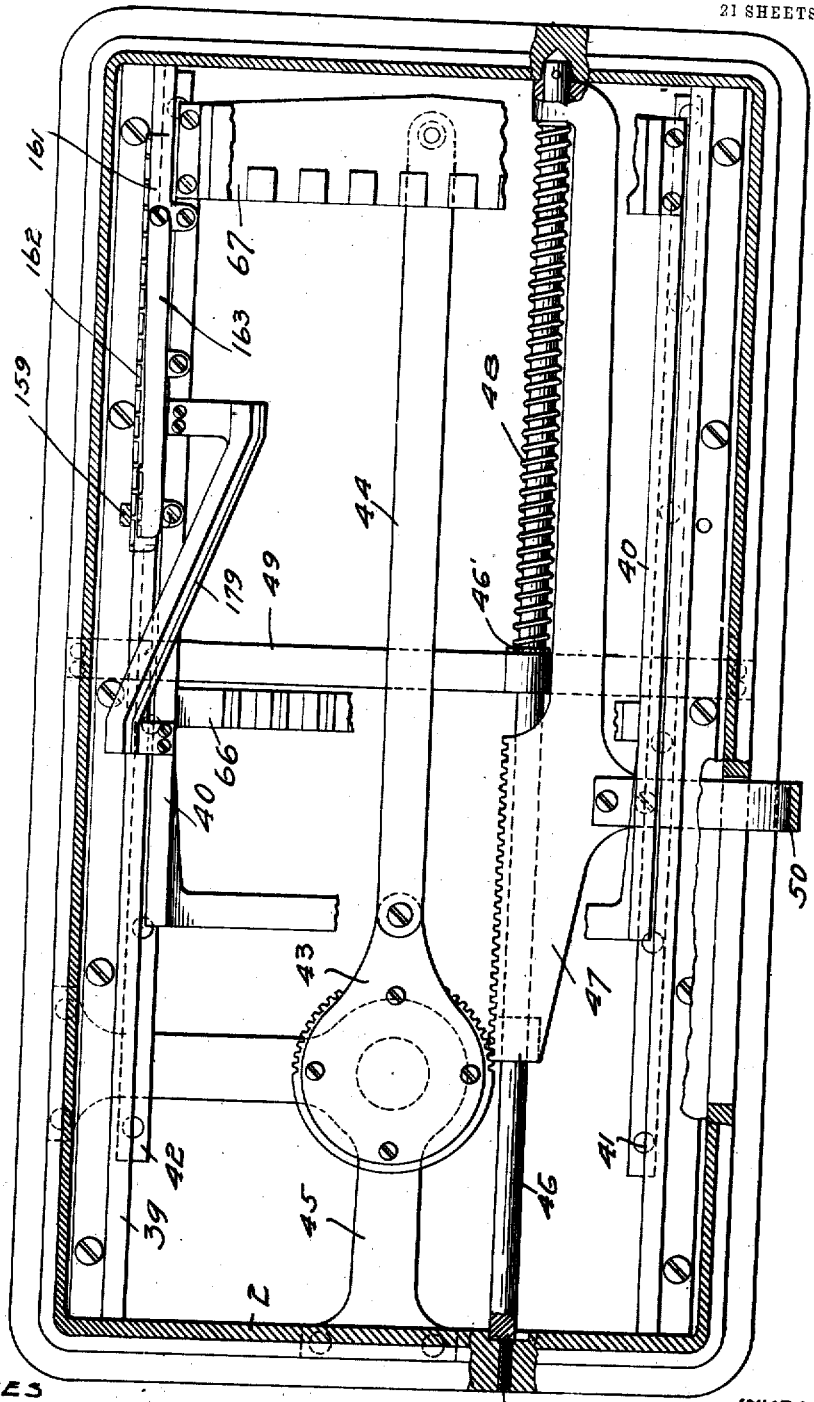
Figure 5:
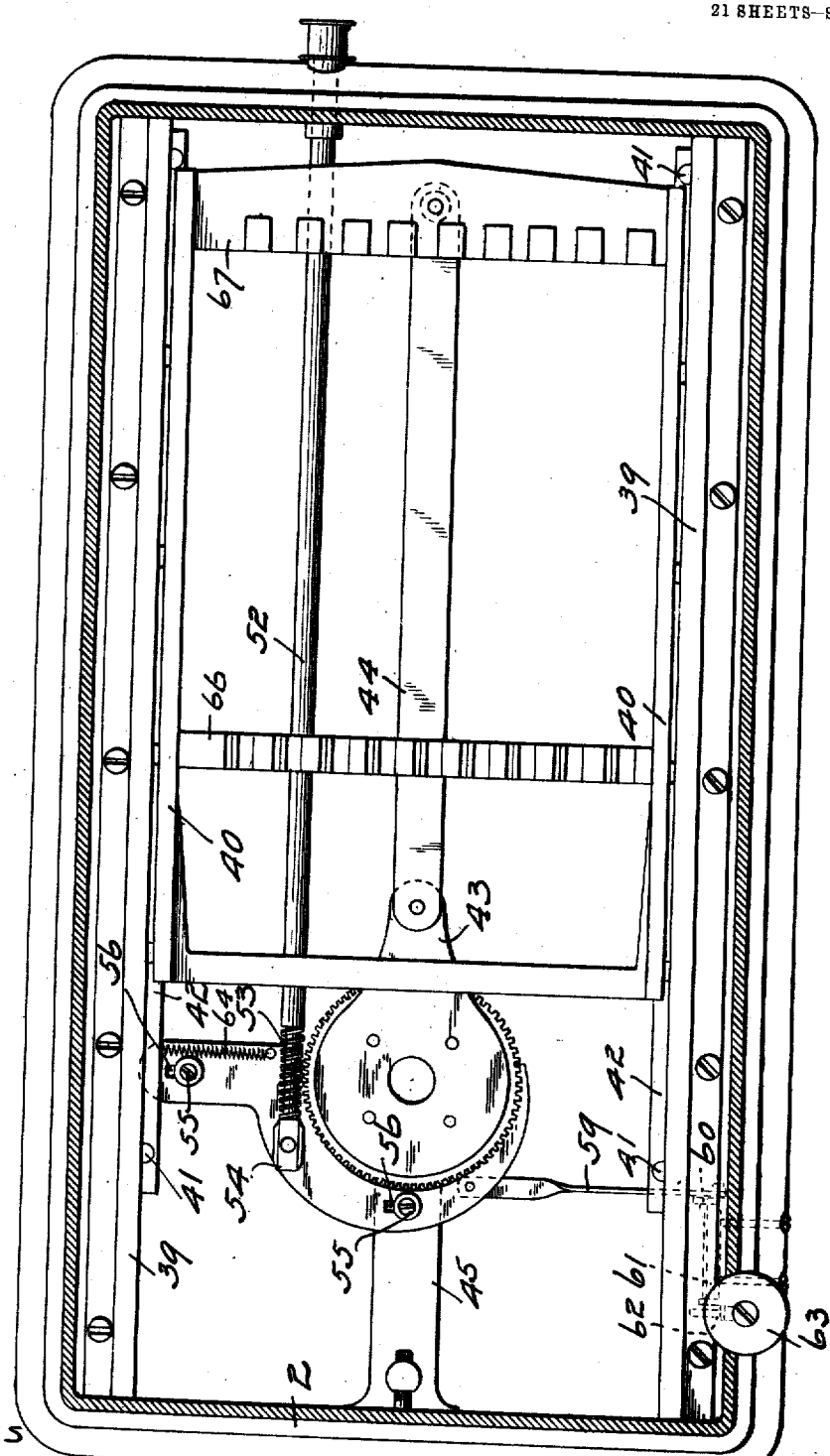
Figure 6:
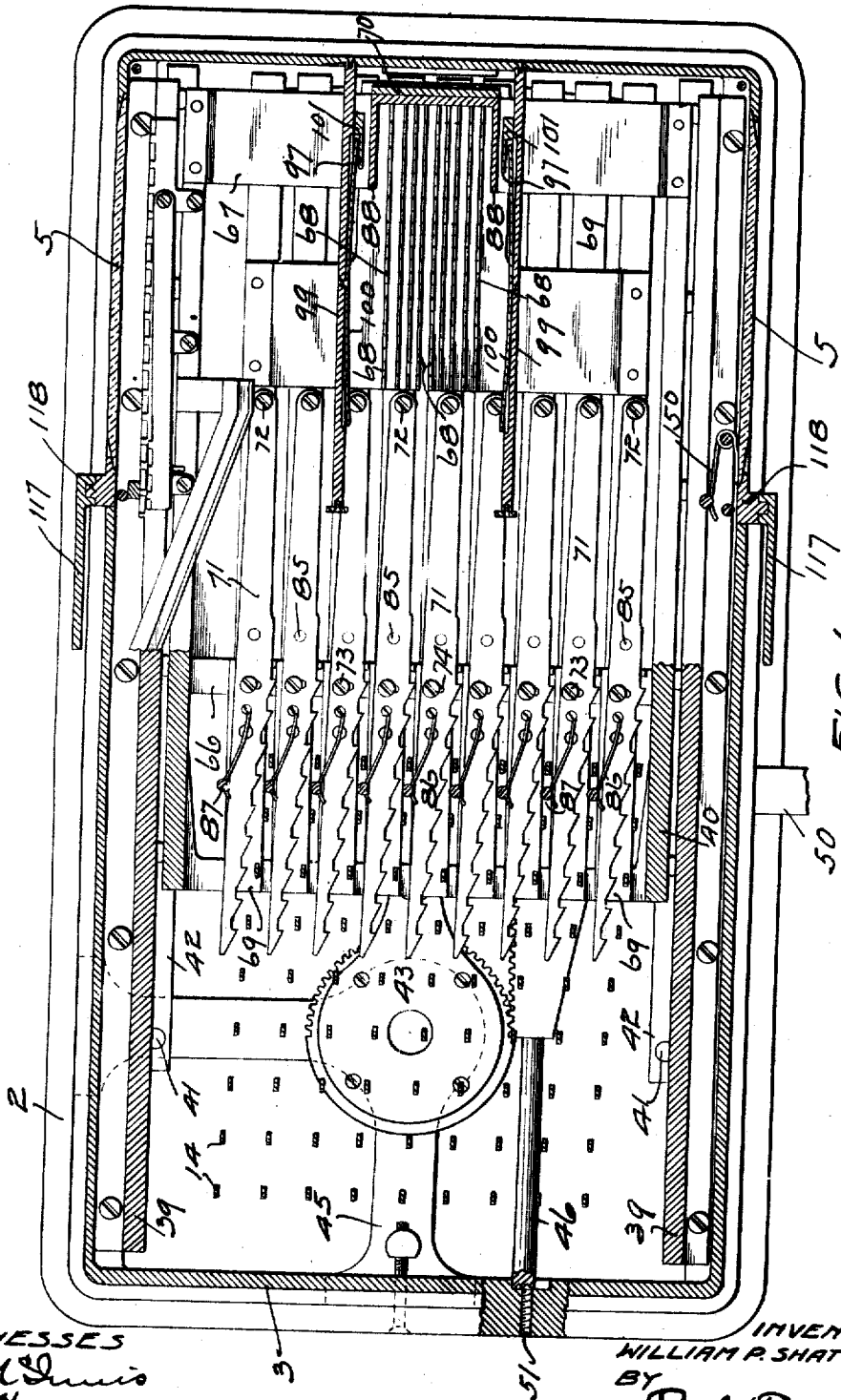
Figure 13:
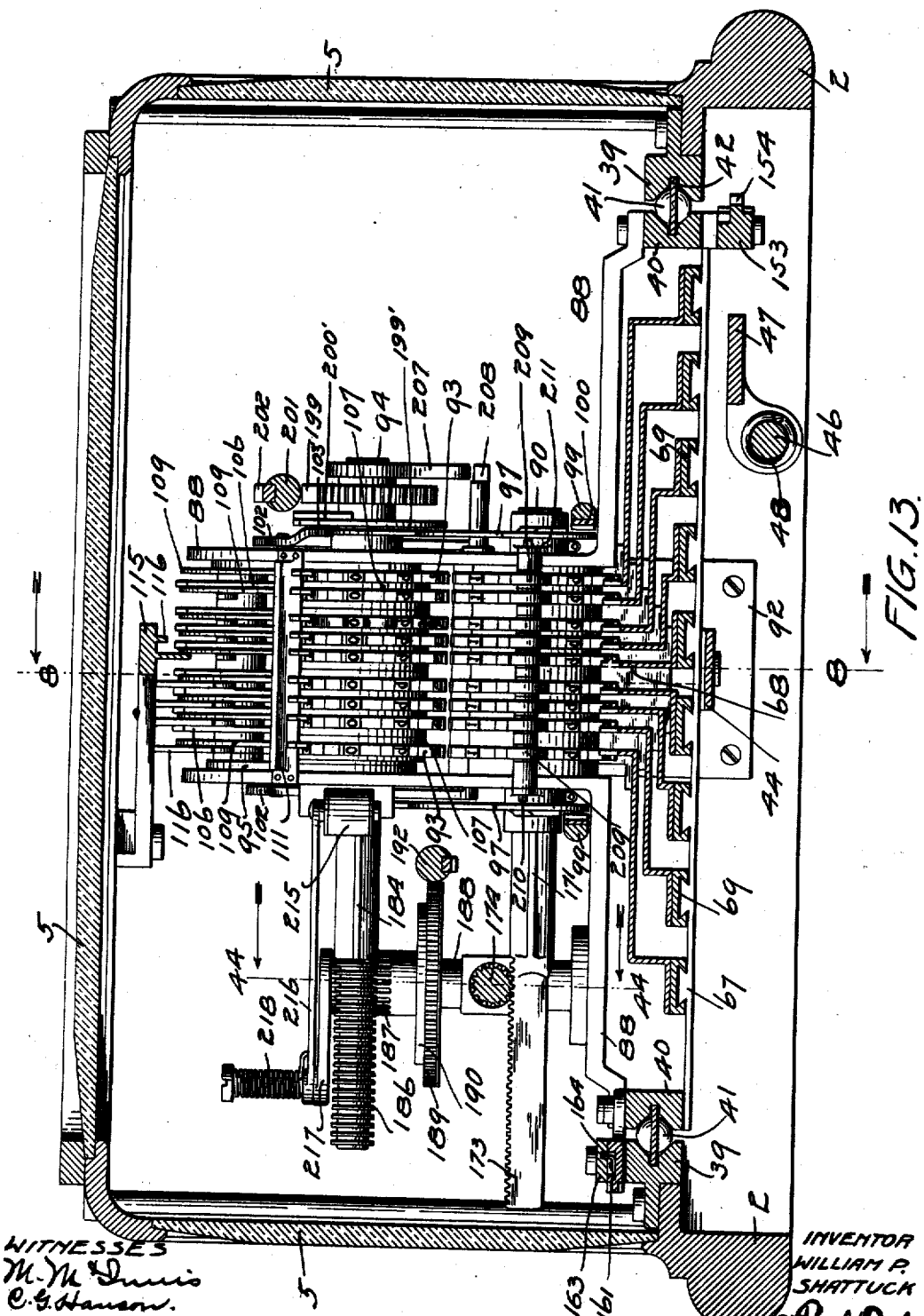
Figure 28:
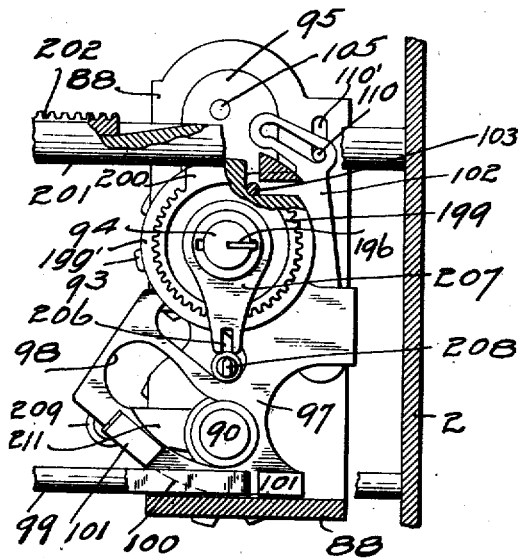
Figure 29:
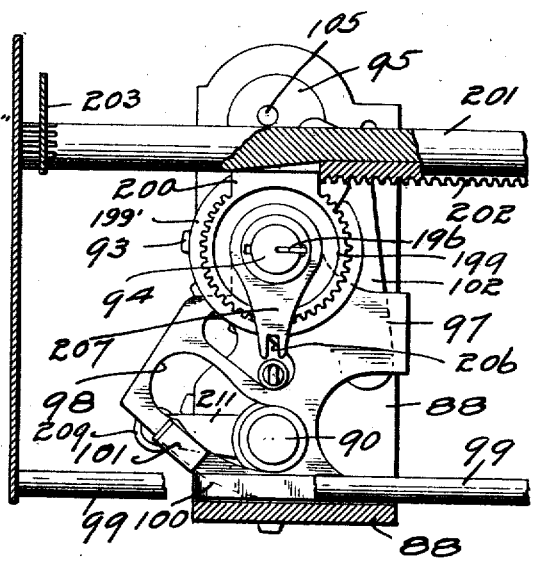
Figure 31:
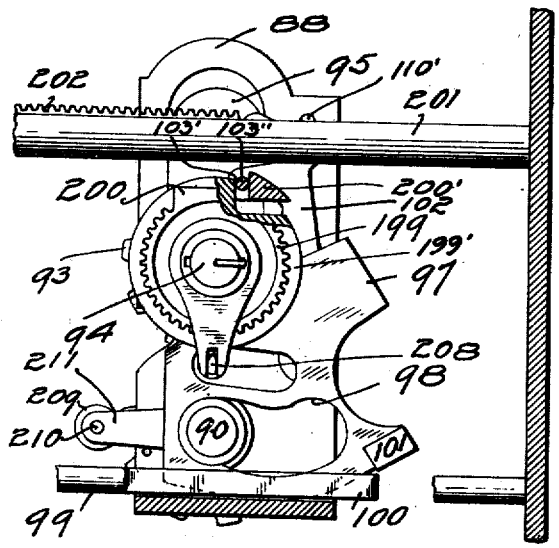
Figure 30:
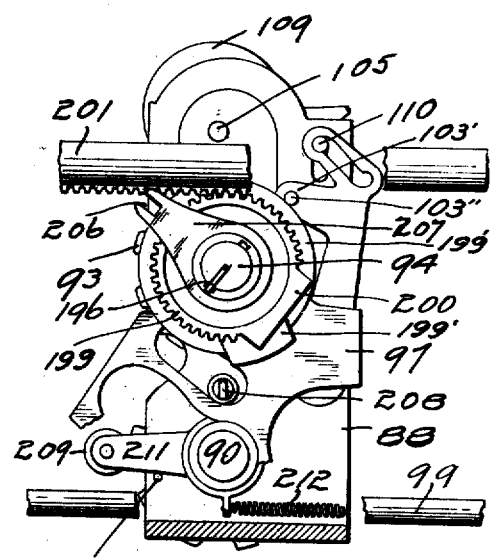

In the accompanying drawings forming part of this specification, Figure 1 is a side elevation of a machine embodying my invention. Fig. 2 is a plan view of the same. Fig. 3 is a bottom plan view of the machine. Fig. 4 is a horizontal section on a plane below the adding mechanism. Fig. 5 is a horizontal section taken on substantially the same plane as Fig. 4, but showing a power-driven shaft for moving the reciprocating carriage. Fig. 6 is a section on line 6—6 of Figs. 7 and 8. Fig. 7 is a longitudinal vertical section of the forward part of the machine, the section being taken on line 7—7 of Fig. 12. Fig. 8 is a longitudinal vertical section of the rear part of the machine, the section being taken on line 8—8 of Fig. 13. Fig. 9 is a vertical detail section on the same plane as Fig. 8 with the type wheels in the position they occupy when printing and the paper carriage in position for receiving an impression from the item wheels. Fig. 10 is a similar view with the total type wheels in the act of impressing the paper. Fig. 11 is a detail section on line 11—11 of Fig. 14. Fig. 12 is a transverse section on line 12—12 of Fig. 7. Fig. 13 is a transverse section on line 13—13 of Fig. 8. Fig. 14 is a transverse section on line 14—14 of Fig. 8. Fig. 15 is a transverse section on line 15—15 of Fig. 7. Fig. 16 is a horizontal section on line 16—16 of Fig. 8. Fig. 17 is a detail section on line 17—17 of Fig. 14. Fig. 18 is a detail section on line 18—18 of Fig. 8. Fig. 19 is a horizontal detail section on line 19—19 of Fig. 8. Fig. 20 is a horizontal detail section on the same plane as Fig. 19. Fig. 21 is a section on line 21—21 of Fig. 8. Figs. 22, 23, 24, 25, 26 and 27 are detail sections taken on line 22—22 of Fig. 21. Figs. 28, 29, 30 and 31 are details of the mechanism for setting the total wheels back to zero. Figs. 32, 33 and 34 are details of the rack-bars and their locks. Fig. 35 is a detail sectional perspective, the section being taken on line 35—35 of Fig. 32. Figs. 36 and 37 are detail plans of the rack-bars and locks, illustrating different positions of the locks. Fig. 38 is a section on line 38—38 of Fig. 20. Fig. 39 is a detail section, on the same plane as Fig. 7, showing one of the keys depressed. Fig. 40 is a detail of the keys and the means for holding them in an elevated position. Figs. 41 and 42 are details of the paper carriage. Fig. 43 is a detail section on the same plane as Fig. 12 illustrating the operation of the repeat key. Fig. 44 is a detail section on line 44—44 of Fig. 13. Figs. 45, 46 and 47 are details of means for connecting the power driven shaft with the means for reciprocating the carriage. Fig. 48 is a detail of the means for elevating the keys.

*The casing.*—In the drawings, 2 represents the case of the machine, which may be of any preferred form or construction. As shown in the drawings, a metallic case is provided having a broad flat base. Upon the rear of the base is an inclosure, preferably of rectangular form, and containing the type-wheels, the inking device and the mechanism connected directly with the type-wheels. The sides and top of this part of the casing may be provided with glass panels 5. The forward portion of the casing is provided with the upright front wall 3 and side walls 4. The side walls have sloping or inclined upper edges (see Fig. 7) and the walls 3 and 4 support the removable key-board.

*The keyboard.*—The key-board consists of a suitable frame 6 supported in an inclined position on top of the inclined side walls 4 of the casing and having secured to it the top plate 7, the front and rear vertical plates 8 and 9, and the horizontal bottom plate 10. A plate 11, parallel to the top plate, is secured to the top-plate by suitable screws 12 and spacing-blocks 13. The key-board is preferably removable as a whole, and when removed all of the keys are removed with it.

*The keys.*—Mounted in the key-board are the vertically movable keys 14, each consisting preferably of a flat bar having upon its side a pin 15. These keys have, at their upper ends, the usual buttons or tops provided with suitable figures or characters. These bars are of increasing length from front to rear of the key-board so that their lower ends are normally all in the same horizontal plane. The key buttons or tops are arranged in rows running from the front to the back of the key-board and numbered consecutively, as shown in Fig. 2. Nine rows of keys are shown in the drawings permitting the registration of numbers up to 999,999,999, or, when recording amounts representing United States or Canadian money, nine million nine hundred and ninety-nine thousand, nine hundred and ninety-nine dollars and ninety-nine cents. Any desired number of rows of keys may be employed. The forward or "1" key-bars stand vertically but the lower portions of the other key-bars are all inclined and so arranged that no two of the key-bars have their lower ends in the same vertical plane (see Figs. 6 and 12). A series of spiral springs 16 are arranged between the inclined parallel plates of the key-board and in frictional contact with notches in the key-bars whereby the keys are normally held in their elevated position (see Figs. 7 and 40). Mounted in slots in the end plates 8 and 9 of the key-board are the locking plates 17. These plates are placed in an inclined position so as to be close to the sides of the key-bars. Each plate is provided with a series of inclined slots 18, one for each key-bar, and when any key is depressed the pin on the key-bar enters the corresponding slot in the plate 17 and moves the plate longitudinally bringing the shoulders 19 under all of the other pins 15 and locking all of said keys (see Fig. 39). By this means only one key in a row can be depressed at any time, and after one key is depressed all of the other keys are locked in their elevated position.

*The key-restoring device.*—When any key has been depressed it remains in its depressed position until restored or elevated by positive means. At the end of each adding and listing operation all of the keys must be restored, and it is also necessary to provide for restoring the keys at any time so that in case the wrong key is depressed it can be restored without adding or listing the number represented thereby. For this purpose a shaft 20 is mounted in bearings 21 secured on the under side of the key-board plate 7 (see Figs. 7, 12, 39 and 48). This shaft is capable of a partial rotation upon its axis and of a slight longitudinal movement in its bearings. A plate 22 is secured to this shaft and its lower edge is notched and enters notches or recesses 17' in the upper edges of the locking plates 17. Each notch 17' is divided into two parts by the projection 17". When the plate 22 is in its normal position and the locking plates are moved longitudinally by the depression of a key the projection 17" moves through the notch in the plate 22 from the position shown in Fig. 7 to that shown in Fig. 39. The shaft 20 is provided at one end with the crank 23 carrying a crank-pin 24. A bell-crank-lever 25' is supported on the wall of the casing by a stud 25 capable of longitudinal movement and the upper end of its short arm is provided with a recess that receives the crank-pin 24 (see Fig. 48). The other end of the bell-crank-lever 25' is provided with a roller 26 that rests upon the sliding carriage, hereinafter described. A bar 27 is pivoted upon a projection 28 on the sliding carriage and its free end rests upon the top of the carriage. On the forward movement of the carriage the roller 26 passes under the bar 27. Upon the return of the carriage the roller rides over the top of the bar thereby rocking the shaft 20 and plate 22 and causing the plate 22 to encounter the wall of the notch 17' and move all of the locking plates 17 in a direction opposite to that in which they were moved by the depression of the keys. This movement elevates all of the keys that have been depressed. With this mechanism whenever the carriage reciprocates all keys that have been depressed are restored or elevated during the backward movement of the carriage. To restore the keys by hand a lever 29 is provided arranged upon the side of the casing or in any other convenient position. This lever is secured upon a short shaft 30 that has secured upon its opposite end within the casing an arm 31 having a projection extending below the long arm of the bell-crank-lever 25'. A spring 32 tends to elevate the end of the lever 30 and depress the end of the arm 31 (see Fig. 48).

*The repeat-key.*—It is sometimes desirable to repeat any number represented by one or more depressed keys. In this instance it is necessary to prevent the restoring device from operating. A key 33 is provided preferably at the left of the regular keys. This key is arranged in line with the shaft 20 and its lower end is preferably held in a guide 34. The side of the key-bar has a projection 35 with an inclined edge opposite the end of the shaft 20. A spring 36 is secured to the plate 22 and to the bar of the key 33. By depressing the key 33 the shaft 20 and plate 22 are moved endwise, thereby moving the bell-crank-lever 25' by sliding its stud 25 in the recess in which it is mounted and carrying the roller 26 out of the plane of the bar 27 so that said roller passes by the side of said bar instead of riding over it. This movement of the plate 22 brings the unnotched parts of its lower edge into the notches 17' so that there is an unnotched part of said plate between one of the walls of each notch, and the side of a projection 17" (see Fig. 43). In this position the plate 22 cannot rock and all of the locking parts 17 are held against longitudinal movement in either direction. While the key is held in its depressed position the restoring device will therefore be prevented from working. When the key is released it is moved upward by the tension of the spring 36, pressing the end of the shaft 20 against the inclined edge of the projection 35, and the bell-crank-lever 25' is restored to its former position and the notches in the plate 22 coincide with the notches in the locking plates 17.

*The movable carriage.*—The casing of the machine is provided in the base portions thereof with suitable guide-rails 39, each having a guide-way in its edge. A carriage 40 is provided, in the edge of each side rail, with a similar guide-way. A series of balls 41 are arranged in these guide-ways and are held at suitable distances apart by the space bars 42 which are arranged in said guide-ways and have recesses which receive the balls. The carriage is adapted to reciprocate on its support and motion is communicated to it by a crank disk 43 and connecting rod 44. The crank disk is supported by ball bearings on a support 45 secured to the casing and it may be turned on its bearings either by hand or by power.

In Fig. 4 a hand-operating device is shown. The edge of the disk in this instance is provided with a series of gear teeth. A rod 46 is secured in bearings in the end of the casing. A sliding rack-bar 47 is arranged to move on this rod and it is provided with a spring 48 that surrounds the rod and engages one end of the rack-bar. The other end of the spring engages a collar 46' on said rod 46. The teeth on the rack-bar engage the teeth on the edge of the disk (see Fig. 4). A handle 50 is secured to the rack-bar and projects through a slot in the wall of the casing. By grasping the handle and drawing it toward the forward end of the machine the crank-disk is turned and the carriage is moved forward. At the same time the spring 48 is compressed (see Fig. 3). When the handle is released the spring returns the rack-bar and the carriage to their former position. The forward end of the rod is preferably secured by a screw 51 in a recess in the wall of the casing. By loosening this screw the rod may be moved to one side and the rack-bar disengaged from the crank-disk. The spring 48 may be omitted and the carriage be moved in both directions by hand. When preferred, the crank-disk may be rotated by an electric or other convenient motor.

In Fig. 5 the crank-disk is shown with gear teeth around its entire edge forming a gear. A shaft 52 is mounted in bearings and is provided with a worm 53 adapted to be moved into engagement with the gear. The forward end of the shaft is supported on a yoke 54 adapted to slide crosswise of the machine and being held and guided by screws 55, extending through slots 56 in the yoke. The edge of the disk is provided with a recess 57, below the gear-teeth (see Fig. 45) and the yoke has, at its end, a dog 58 adapted to enter this recess. A rod 59 is connected to the yoke and to a disk 60 on a short shaft 61 mounted in bearings on the wall of the casing. The other end of this shaft is provided with a pinion engaging a rack-bar 62 (see Fig. 47) that extends up along the wall of the casing and is provided with a button 63. A spring 64 is connected to the yoke and to the wall of the casing. This spring tends to draw the yoke toward the wall of the casing and thereby to move the worm out of engagement with the gear. It can do this, however, only when the dog 58 is opposite the recess 57. By depressing the rack-bar 62 the dog is moved out of the recess and the worm into engagement with the gear. If the worm shaft is then rotating the gear will make a complete revolution, and then stop. This will give the carriage a forward and a backward movement. The worm shaft may be rotated by an electric or any other suitable motor.

Any other suitable device may be employed instead of that herein shown and described for transmitting motion from the motor to the crank-disk of the machine. It is necessary to provide means to cause the carriage to move forward and backward and then stop. Any means that will do this, whether operated by hand, by foot-power, or by a suitable motor may be employed.

*The rack-bars.*—In my former patent, hereinbefore referred to, I employed a series of spirally grooved shafts for operating the type-wheels as the carriage was reciprocated. In my present invention I employ in place of these shafts a series of rack-bars arranged upon the sliding carriage and engaging the type-wheels. These bars move with the carriage and the type-wheels, which are also supported upon the carriage. When any key is depressed the lower end of the key-bar is projected into the path of the corresponding rack-bar and forms a stop for said bar. As the bar is now held stationary while the carriage and type-wheels continue their sliding movement, the wheels which are in engagement with the stopped rack-bars must rotate, and the extent of its rotary movement will depend upon the position of the key that has been depressed. If the 9-key is depressed the wheel will make nine-tenths of a revolution, so as to bring the 9-type into printing position. If the 1-key is depressed it will not stop the rack-bar until the carriage has nearly completed its forward movement and the type-wheel will be turned only one-tenth of a revolution and the 1-type will be brought into printing position, and a corresponding result will be obtained by depressing any of the other keys. The depression of any key will cause the stoppage of the corresponding rack-bar at the proper time and a sufficient rotation of the corresponding type-wheel to bring the type corresponding to the number on the key into position for printing. The rack-bars 65 consist of flat bars of metal or other suitable material supported on cross-bars 66 and 67 on the carriage. Suitable groove-connections are provided between the under surfaces of the rack-bars and the upper surfaces of the cross-bars to hold the rack-bars in position while permitting the rack-bars to slide freely longitudinally over said cross-bars (see Figs. 12, 13, 15, 18 and 21). One rack-bar is provided for each row of keys and type-wheel. Each rack-bar is provided near its rear end with a rack 68, secured to the bar and engaging the corresponding type-wheel. These racks are offset and extend one over another so that the type-wheels may be located close together (see Figs. 6, 13, 15, 18, 20, 21 and 30). Each rack-bar is provided at its forward end with a series of shoulders or offsets 69, nine in number (see Fig. 33), and these shoulders are so located that one of them is in line with the lower end of each key-bar. As before stated, the lower ends of the key-bars are not in line with one another. If the 1-key is depressed its lower end is in line with the shoulder nearest the front end of the rack-bar, and as the carriage is moved forward this shoulder will engage the lower end of the key-bar and the rack-bar will be stopped. A like operation will take place when any other key is depressed. The rear portions of the racks are preferably arranged to pass through a grooved guide-plate 70 secured upon the carriage in the rear of the type-wheels (see Fig. 18). The shoulders 69 for each bar are preferably all provided in a single strip of metal or other suitable material secured upon the top of the rack-bar.

*The rack-bar locks.*—As the carriage is moved quite rapidly it might be possible for the shoulders thereon to strike the ends of the depressed key-bars with sufficient force to cause the rack-bar to rebound and hence to give a reverse movement to the corresponding type-wheel. To prevent this I provide means that will lock the rack-bars to the depressed key-bars and maintain this position until the motion of the carriage is reversed. The rack-bar locks consist essentially of a series of toothed bars 71 pivoted at 72 upon the rack-bars, their free ends being held, so as to permit a slight movement in a plane parallel to the top of the rack-bar, by a screw or pin 73 that passes through a slot 74 in the bar 71 and is secured in the rack-bar (see Fig. 37). Arranged below the rack-bars is a slotted plate 75 (see Fig. 3) that is supported on the carriage and is capable of a slight transverse movement thereon. A grooved plate 76 is secured to the casing and a projection 77 on the plate 75 is provided with a pin 78 that projects into the groove 79 in the plate 76. The forward portion of the groove 79 is connected with both ends of a parallel groove 80 (see Fig. 32). The slots 81 in the plate 75 each have at one end a recess 82 extending from the main part of the slot and each slot has also a series of recesses 83 separated by the ratchet projections 84. The backs of the grooves 79 and 80 are formed by the spring plate 80' (see Fig. 35). A pin 85 projects from the under side of each locking bar 71 through a slot in the rack-bar and into one of the slots 81 in the plate 75 (see Fig. 8).

At the beginning of the operation the parts are in the position shown in Fig. 32 with the pin 85 in the beginning of the extension slot 82. The locking bar can now swing freely on its pivot. As the rack-bar moves forward, if a key is depressed, (as represented in Fig. 33) one of the teeth on the locking bar strikes the key-bar and the locking bar swings to one side and permits the key to come against the appropriate shoulder on the rack-bar. This movement of the locking bar brings the pin 85 from the position shown in Fig. 32 to that shown in Fig. 33, and a further movement of the carriage brings the parts into the position shown in Fig. 34. The key-bar of the depressed key is now securely locked between the shoulder on the key-bar and the straight face of the tooth on the locking bar. This condition continues until the carriage reaches the end of its forward movement, when the pin 78 on the projection 77 rides up the incline at the end of the slot 79 into the end of the slot 80 (see Fig. 36). This draws the plate 75 toward the side of the machine and the pins 85 are engaged by the recesses 83 and the locking-bars are swung to one side clear of the depressed keys, thereby permitting the rack-bars to move backward with the carriage. During the first part of the backward movement of the carriage the pin 78 travels in the slot 80 until the locking-bars are clear of the depressed keys and then it moves into the slot 79 (see Fig. 34) and the plate 75 is brought back into its original position. Springs 86 are secured on the locking bars and just as the carriage reaches the end of its backward movement these springs encounter the pins 87 on the underside of the lower plate of the key-board (see Fig. 7) and give the locking bars a slight swinging motion bringing them back to their normal position (see Fig. 32) and moving the pins 85 into the slot extensions 82.

*The listing or item type wheels.*—The machine employs two sets of type wheels. One set of these type wheels 87 I term the "item" or "listing" type wheels. They are in mesh with the racks of the rack-bars and at each forward movement of the carriage they rotate if a controlling key is depressed so as to bring a type corresponding to the number of the key that is depressed into printing position. Upon the backward movement of the carriage, all of these type wheels are rotated in the reverse direction and the zero type are all brought into printing position. These listing or item type wheels are engaged during their forward movement by the wheels which print the totals. These wheels, for convenience, I designate as the "total" wheels. Upon the backward movement of the carriage, the total wheels are moved out of engagement with the item wheels so that the total wheels are not returned to zero with the item wheels. All of the type wheels are mounted in a frame or housing 88 that is supported, preferably in an upright position, upon the reciprocating carriage. I have shown in the drawings nine of the item type wheels, this being one type wheel for each row of keys. These wheels are mounted so as to rotate freely upon a shaft 90 supported in bearings 91 in the side walls of the housing 88. The item-type wheels 87, as shown, are engaged directly by the racks on the rack-bars (see Figs. 9 and 10) and when the carriage is at the rear position the zero type are all in printing position; that is to say, they are in such position that if the carriage were moved forward without rotating any of the wheels, the zero type would be impressed upon the paper held by the printing roller, hereinafter described. If preferred, the item type wheels need not be engaged directly by the racks but instead, intermediate gears may be provided between the racks and the item type wheels. It will be understood that when none of the keys are depressed and the carriage is reciprocated, the rack bars move with the carriage and the item type wheels are not rotated. When, however, any key is depressed, as already explained, the corresponding rack bar is stopped and as each type wheel moves forward with the carriage it must necessarily be rotated and the amount of rotation given to it will be proportioned to the number of the key that has been depressed. When the carriage is moved backward the ends of the rack-bars that have been stopped during the forward movement of the carriage, strike the rear wall of the casing, or a cushion 92 secured thereon, and thereby said rack-bars are held in a stationary position and the corresponding item type wheels have their zero type brought into printing position. The paper to be printed upon is arranged to pass around a suitable roller, hereinafter described, and this roller is arranged in front of the rectangular inclosure forming the rear part of the casing (see Fig. 8). With the paper in this position as the carriage reaches the forward limit of its movement, the type at the front of the item wheels are pressed against the paper at substantially the center of the roller and thereby impress upon said paper a number corresponding to the numbers of the keys that have been depressed.

*The total type wheels.*—The wheels which add the amounts represented by succeeding operations of the machine and which print the total or sum of such amounts I designate the "total" wheels. These wheels 93 are the same in form and in number as the item wheels, being made in the form of gear wheels with type upon the ends of the teeth, and they are adapted to mesh directly with the item wheels, and when thus in mesh they rotate with said item wheels. The wheels 93 are mounted so as to turn freely on a shaft 94 arranged above and parallel with the shaft 90. This shaft is mounted in slides or blocks 95 arranged in recesses in the walls of the housing. A hub 96 projects from each of the blocks 95 surrounding the bearing in which the shaft 94 is mounted and pivotally supported upon these hubs is a yoke 97. This yoke extends downward on both sides of the housing and across the back of the housing (see Figs. 20 to 31). It is provided at each side of the housing with a cam slot 98 through which the shaft 90 extends. When the yoke is in the position shown in Figs. 28, 29 and 30 the total wheels are raised out of mesh with the item wheels. When it is swung to the position shown in Fig. 31 the cam slot causes the total wheels to be brought down into engagement with the item wheels.

*Means for moving the yoke.*—During the forward movement of the carriage the total wheels are in engagement with the item wheels, while during the backward movement they are out of engagement. It is necessary therefore to swing the yoke in one direction at the beginning of the forward movement of the carriage and in the other direction at the beginning of the backward movement. This is accomplished by the following means: Arranged at each side of the housing, below the item wheel shaft, is a fixed bar 99. Each of these bars has, upon its inner surface, a double spring 100. The yoke 97 has the blocks 101 secured to its outer surface at the lower edge thereof, one of said blocks being at the rear of the yoke and the other near the front thereof. When the carriage reaches the rear end of its movement, the yoke being in the position shown in Fig. 28 of the drawings, the rear end of the block 101 slips by the rear end of the spring 100 and the end of the spring is then in position to engage said block (see Figs. 6 and 28). When the carriage starts to move forward the engagement of the spring with the block turns the yoke into the position shown in Fig. 31 of the drawings. This brings the total type wheels down into engagement with the item wheels. When the parts reach this position the block 101 will be rocked upward so that it is above the end of the spring 100 and will be free to pass over said spring. When the carriage reaches the forward limit of its movement, the parts being in the position shown in Fig. 31, the block near the forward edge of the yoke will pass by the forward end of the spring 100 and when the carriage starts backward, the engagement of the spring with the block will turn the yoke from the position shown in Fig. 31 to that shown in Fig. 28, thereby elevating the total type wheels and freeing them from the item type wheels. The end of the spring will remain in engagement with the block 101 until the yoke has rocked sufficiently to raise the block above the end of the spring. The yoke will then pass over the top of the spring and these operations will be repeated as the carriage is moved forward and back.

*The carrying device.*—It will be understood that each time any one of the total wheels, except the last one, makes a complete revolution, the next succeeding wheel must be turned one tenth of a revolution, and this operation must necessarily take place when the total wheels are out of engagement with the item wheels, or during the return or backward movement of the carriage. In order to secure accurate results it is desirable to produce this movement by positive means, without depending upon the action of the springs. I have provided means which are absolutely positive and which can never fail to work. Above the total wheels is a small rod or shaft 105 mounted in the blocks that support the shaft of the total wheels. Mounted so as to turn freely on this shaft are a series of four pointed star-wheels 106. Two of the points of the star-wheels are formed of a diamond shaped plate and the other of a nearly S-shaped plate. These plates are secured side by side and are arranged so that the points are at right angles to one another. Secured upon the side of each type wheel is a ring 107 having a single tooth 108. The pointed teeth of each star-wheel are in the same vertical plane with one of the rings 107 and the curved teeth of the same star-wheel are in the vertical plane with the next type wheel. A yoke 109 is arranged above the hub of each star-wheel. One end of the yoke is slotted and engages a transverse pin or rod 110 and the other end is held in a slot in a cross-plate 111. This yoke is arranged between the two plates forming the star-wheel and it is provided with a point 112 that bears on the hub of this wheel between such plates. The hub of the wheel is provided with two curved slots 113 (see Fig. 25). This yoke is held in a stationary position as long as the point 112 is in contact with the ungrooved portion of the hub of the star-wheel. As soon as one of the slots comes opposite the point 112 the yoke can move upward and backward on the line of the slot in said yoke. The part of the yoke just below the slot is adapted to fit between two of the teeth of one of the total wheels, and when these wheels are raised they engage said yokes (see Fig. 24) and are locked against accidental rotary movement. The normal position of the star-wheel is shown in Fig. 27 with one of its pointed teeth against the edge of the ring 107. A spring dog 114 secured on the yoke engages the edge of this tooth and prevents accidental movement of the star-wheel. Arranged above the type-wheels and secured to the machine casing is a diagonally placed bar 115 having a series of depending teeth 116. There is one of these teeth in the same vertical plane with the curved points of each star-wheel.

The carrying operation is as follows: During the forward motion of the carriage, while the total wheels are in engagement with the item wheels, they are free from the yoke and rotate freely with the item wheels. The star-wheels stand in their normal position shown in Fig. 22. As each total type wheel makes a complete revolution, the tooth 108 on the ring 107 connected to such wheel engages one of the points of the star wheel and moves it from the position shown in Fig. 22 to that shown in Fig. 23. During the forward movement of the carriage the star-wheels pass below the lower ends of the teeth 116. When the carriage begins its backward movement and the total type wheels are raised, they engage the yokes 109 (see Fig. 24) and are thereby locked. As the carriage continues to move the curved teeth of the star-wheels encounter the fixed teeth 116 (see Figs. 25 and 26) and are turned from the position shown in Fig. 24 through the positions shown in Figs. 25 and 26 to that shown in Fig. 27. During this movement one of the slots 113 on the hub of the star-wheel comes opposite the point 112 on the yoke freeing the yoke and permitting it to move upward and unlock the total type-wheel, which is then turned one-tenth of a revolution by the movement of the star-wheel. As the teeth 116 are arranged so as to be successively engaged by the star wheels, the carrying operations for the different wheels take place successively beginning with the units wheel.

*The paper carriage.*—A paper carriage is provided arranged upon the forward part of the rectangular inclosure constituting part of the case of the machine. This carriage is supported upon the frame 117 secured and adapted to slide upon the vertical ways 118 fixed to walls of the case. Both the front wall of the case and this frame have an opening in line with the type wheels of sufficient size to permit the type, at the front of the wheels, to project through the case and through this frame when the sliding carriage is at the forward limit of its movement (see Figs. 9 and 10). Hinged to this frame is the paper carriage consisting of the swinging frame 119 carrying the printing roller 120, the feed-rollers 121 and 122, and the paper guides 123 and 124. The frame 117 extends in front of the paper-carriage and has a plate 125 extending across the machine and provided with a shoulder 126. A locking plate 127 is provided with lugs which are pivotally mounted on the shaft of the roller 122. When the carriage is in position for printing this plate engages the shoulder 126 on the plate 125 and holds the paper carriage firmly when the type-wheels press the paper against the printing roller 120 (see Figs. 9 and 41). The shafts of the feed rollers 121 and 122 are loose in their bearings and springs 128 are connected to sleeves 129 on the ends of these shafts and to a sleeve 130 on the end of the printing roller 120 and serve to hold the feed rollers with yielding pressure against the surface of the printing roller. The paper guides 123 are in the form of clips adjustably mounted on a rod 131 secured on the front of the swinging frame 119. The paper guides 124 consist of metal strips secured on the back of the frame 119 and extending partially around the printing roller, grooves 132 being formed in the roller 122 to receive the end of said guides, which may be looped around the roller as shown in Fig. 10. The hinge between the swinging frame 119 and the sliding frame 117 is so formed that the paper carriage may be laterally adjusted. As here shown the frame 117 has two series of projecting lugs 133 with narrow spaces between their ends. The top edge of the frame 119 has a rod 134 secured to it. Slots 135 are formed in the frame 119 below the rod 134 through which the lower series of lugs 133 project (see Fig. 15). By turning the paper carriage upward into the position indicated by dotted lines in Fig. 8 it may be moved laterally in either direction, and when the lugs are again opposite the slots it may be swung downward into position for printing. The paper can thus be adjusted laterally in either direction and any part of it can be brought into position to be printed upon. By this means paper of any width, within the limits of the carriage, can be used and parallel columns of figures can be printed thereon. Single sheets of paper may be employed, or the paper may be in the form of a roll, as shown in the drawings. For supporting a roll of paper rods 136 are secured upon the top of the casing and adjustable brackets 137 are secured upon said rods. These brackets form a support for a roller 138 carrying the paper. The paper is arranged under the rod 131 and its edges are guided by the guides 123. The paper passes between the rollers 121 and 120, around the roller 120 and between the rollers 120 and 122 (see Fig. 9). The strips 124 assist in guiding it around the roller 120. When the paper carriage is in the position shown in Fig. 9 of the drawings, the printing roller is in line with the item wheels and when the sliding carriage reaches the forward limit of its movement the type at the front of the horizontal center of the type-wheels will press the paper against the roller 120, and an impression will be made thereon. By raising the paper-carriage to the position shown in Fig. 10, as hereinafter described, the roller 120 will be in position to coöperate with the total wheels in making an impression on the paper from said wheels representing the sum or total of the items printed by the item wheels. For convenience in turning it by hand, the ends of the shaft of the roller 120 may be provided with the milled wheels 139. The locking plate 127 may be provided with the finger pieces 140 for convenience in raising said plate. When the sliding carriage is at its lowest point it is preferably supported by a pin 141 in the casing (see Figs. 41 and 42).

*The type-alining device.*—As there may be some lost motion in the type-wheels it is desirable to aline the type as they are brought into printing position. For this purpose a wedge-shaped bar 142 is secured upon the sliding-frame in such position that the teeth of the type-wheels pass above and below said bar and the type are thereby brought into alinement (see Figs. 9 and 10).

*The paper feed.*—The feed roller 121 is serrated. A shaft 143 is mounted in bearings on the sliding frame 117 and mounted on this shaft is a hollow shaft 144 provided with a series of pinions 145 engaging the serrated roller 121. In whatever position the paper carriage may be, whether adjusted to the right or the left, one or more of the pinions 145 will always engage the serrated roller 121. Mounted in bearings inside of the casing of the machine is a vertical shaft 146. This shaft has a worm-wheel 147 splined thereon and connected to the vertically sliding frame 117 by lugs 148 on said frame (see Fig. 41). This worm engages a worm pinion 149 on the hollow shaft 144. The shaft 146 is arranged to have a slight vertical movement through its bearing in the stationary rail that supports the sliding carriage (see Fig. 15). Two circumferential grooves are formed in this shaft and a spring 150 on a stationary support is arranged to engage one or the other of these grooves. On the lower end of the shaft is a pinion 151 and a disk 152 cut away at one side. Upon the sliding carriage below its side rail is a bar 153 carrying a rack 154. Above the rack is a groove 155 parallel with the rack. (Figs. 3 and 11.) Beyond each end of the rack is an inclined ledge 156. When the carriage is moving forward the flat face of the bar 153 slides by the flat part of the disk 152 and the shaft is kept from turning. When the inclined ledge hits the disk it moves under said disk and moves the shaft upward until the spring 150 engages the lower groove in the shaft and holds the shaft in its upper position. Upon the return of the carriage the rack 154 engages the pinion 151 and the groove 155 receives the edge of the disk. The shaft is rotated and with it the feed-roller 121 of the paper carriage. As the carriage reaches the limit of its backward movement the other inclined rib engages the top of the disk and moves the disk and shaft to their lower position. By this means the paper is fed only during one movement of the carriage.

*Means for raising the paper-carriage.*—Means are provided for causing the frame 117 and the paper-carriage supported thereon to move upward so as to bring the printing-roller 120 and the part of the paper that is to receive the impression, opposite the total wheels when a total is to be printed, and to lower it to its original position after such operation. The shaft 143 is provided at each end with pinion 143 that engages a vertical stationary rack-bar 158. This causes both ends of the frame 117 to move in unison and prevents its binding on the vertical ways. The frame 117 has secured to it at one side of the machine a vertical rack-bar 159 having a series of inclined rack-teeth 160. Secured upon the sliding carriage 40 is a stationary rack-bar 161 also having a series of inclined rack-teeth 162 (see Figs. 16 and 17). The teeth of the rack-bar 161 ordinarily project into a groove in the rack-bar 159 (see Fig. 14), so that as the carriage is reciprocated the teeth on the two rack-bars do not engage. Pivoted upon the rack-bar 161 is an auxiliary rack-bar 163, and a spring 164 normally holds the rack-bar 163 out of engagement with the rack-bar 159 (see Fig. 16). A lever 165, pivoted on the casing, has one end in engagement with the auxiliary rack-bar 163. The other end of this lever is pivoted to an operating lever 167, which extends outside of the casing and is provided at its end with a button or key 168. A spring 169 is connected to the lever 165 and also to the lever 167. This spring tends to draw the ends of the levers toward each other. When it is desired to raise the paper carriage for printing a total the end of the lever 167 is depressed and thereby, through the lever 165, the auxiliary rack-bar 163 is moved outward into position to engage the vertical rack-bar 159 as the carriage moves forward. This starts the vertical rack-bar in its upward movement, and as soon as the groove in this rack-bar is above the rack-bar 161, the teeth of the vertical rack-bar are engaged by the teeth of the rack-bar 161 and the upward movement of the vertical rack-bar and the carriage continues during the forward movement of the sliding carriage 40, and the paper is brought into position to receive an impression from the total wheels. Upon the return of the sliding carriage 40 the engagement of the rack-teeth forces the paper carriage downward to its original position. As the auxiliary rack-bar is used only for the purpose of starting the paper-carriage upward the operating lever may be released after this movement begins and the spring engaging said auxiliary rack-bar will move it out of engagement with the vertical rack-bar.

*Setting back the item wheels.*—It is necessary to set back each of the item wheels that are not to make an impression on the paper, as the wheels are brought into printing position, so that their type will not come in contact with the paper. As there are nine item wheels, if a number, consisting of less than nine figures, is to be listed it is apparent that if the wheels that are not to print were left in their normal position one or more ciphers would be printed at the left of the listed number. This is prevented by the following means: The shaft 90 upon which the item wheels are mounted, projects to the left beyond the frame or housing 88 in which it is mounted. This part of the shaft is slightly offset, and is provided with the feathers 170 and 171 at its opposite sides (see Figs. 16 and 21). Each item wheel is provided with a groove 172 at one side of its central opening, and when all of the item wheels stand with their zero-type in printing position these grooves are all in line and if the shaft 90 is pushed through the wheels the feather 170 on the shaft will move the wheels backward bodily away from the line of the paper to be printed upon, and the feather 171 will engage the grooves 172. The type of the wheels thus engaged will not come in contact with the paper (see Fig. 16). For moving the shaft 90 through the wheels the right distance to set back the wheels that are not to print, the rear end of the shaft 90 is formed into a rack-bar 173. This rack-bar is engaged by a serrated shaft or long pinion 174, that is mounted in bearings in the casing. A plate 175 is arranged below the paper carriage and is pivotally supported at its rear edge and capable of sliding laterally on the horizontal rods 176 arranged upon the inner wall of the casing. The rear edge of the plate is also provided with a rack-bar 177 that engages the pinion 174. The forward edge of the plate is provided with an arm 178 having a depending pin adapted to be engaged by an oblique groove in a bar 179 secured on the sliding carriage.

Secured to the forward edge of the plate 175 is a vertical plate 180 having a series of projections 181 with inclined lower surfaces. Each of the key-locking plates 17 is provided at its rear end with a projection 182 that, when the plate is moved backward by the depression of one of the keys in the row above it, will be in line with the corresponding projection 181, and, as the plate 175 is moved laterally, the appropriate projection 181 will come in contact with the projection 182 on the left hand locking-bar 17, that has been moved, and riding up on such projection will raise the forward edge of the plate 175 until the pin in the arm 178 is disengaged from the groove in the bar 179, and the lateral movement of the plate 175 and consequently the movement of the shaft 90 will cease. As soon as the keys are raised and the locking-bars 17 are retracted the plate 175 drops, and its pin again engages the groove in the bar 179, and on the return of the carriage the plate 175 and the shaft 90 are moved back to their original position. By this means all of the wheels to the left of those that are to print are set back of the printing line so that their zero-type do not come in contact with the paper.

*Setting back the total wheels.*—Similarly the total wheels that are not to print are set back of the printing line so as to make no impression on the paper. The mechanism for securing this result is shown most clearly in Figs. 13, 14, 19, 20 and 44 of the drawings. The shaft 94, upon which the total wheels are mounted, is offset and provided with the feathers 183 and 184 and the total wheels are provided with the groove 185. By sliding this shaft through the wheels, said wheels are set back (see Fig. 19). The movement of the shaft continues as long as the grooves 185 are in line, or until a wheel is reached that has been turned from its zero position. The end of the shaft 94 is formed into a rack-bar 186, the teeth, however, being circumferential so that the shaft may be rotated while its rack-teeth engage the operating pinion 187. A standard 188 supports a gear 189, said gear having a long hub that is adapted to turn on said standard (see Fig. 44). Upon this sleeve is mounted the pinion 187 also having a long hub and a disk 190 that rests on the gear 189. A spring dog 191 on the gear is adapted to engage a notch in the edge of the disk 190 (see Fig. 20). A shaft 192 is mounted in the casing and is provided at one side with the rack-teeth 193. The lever 167 has a gear segment at its end which engages a series of gear-teeth on the shaft 192. When a total is to be taken the outer end of the lever 167 is depressed and thereby the mechanism that raises the carriage is thrown into operation, as above described, and at the same time the shaft 192 is turned so as to bring the rack-teeth 193 into engagement with the gear 189. As the carriage moves forward the gear is turned and the pinion 187 turns with it until the end of the feather 183 strikes the side of a type-wheel that has been turned from its zero-position. The spring-dog then is disengaged from the notch in the disk 190 and the movement of the pinion ceases while the movement of the gear continues. Upon the return of the carriage the movement of these parts is reversed and the shaft is drawn back to its original position. The teeth on the gear 189 do not extend around its full circumference, but there is an unserrated flat portion 194 that bears against the side of the shaft, when the shaft is in its normal position. This flat portion slides along the side of the shaft except when the shaft is turned so as to bring its rack-teeth into engagement with the teeth of the gear.

*Returning total wheels to zero.*—Means are also provided for returning the total wheels to zero after each total has been printed or "clearing the machine" as it is usually called. For this purpose each ring 107 that is secured to the side of each total wheel is provided with the inwardly projecting lug 195. The shaft 94 is longitudinally slotted and in this slot is arranged a thin bar 196 provided with a series of teeth 197'. At each end the bar 196 is provided with a lug 197 that engages a slot 198 in the shaft bearing block 95. This slot is in the form of a circle with a straight portion at one side (see Fig. 38). When the shaft is in its normal fixed position the lugs 197 are in the straight portions of the slot, and the bar 196 is moved into the slot in the shaft so that its teeth do not come in contact with the lugs 195 as the total wheels rotate. The end of the shaft 94 has fixed to it a gear 199 having a flat projection 200. Above said shaft is a shaft 201, mounted in bearings in the casing and provided on one side with the rack-teeth 202. An operating lever 203 is pivoted on the wall of the casing and has on its end a segment of a gear, the teeth of which engage a pinion formed on the shaft 201. The outer end of the lever 203 is provided with the button 204. A spring 205 engages the lever 203 and tends to depress the inner end of the lever and thereby to turn the shaft 201 so that its rack-teeth are out of engagement with the gear 199. When it is desired to "clear the machine" the operating lever is depressed and thereby the shaft is turned so as to engage the gear upon the backward movement of the carriage. (During the forward movement of the carriage the shaft 94 is in its lower position, as already explained, and the gear cannot engage the rack-teeth on the shaft 201.) The shaft 94 is thereby rotated. The bar 196 is moved out of the slot in the shaft and the teeth thereon engage the lugs 195 on the rings 107. At this time the total wheels are unlocked and are free to rotate (see Fig. 27) and they are turned with the shaft 94 until they are all brought back to zero, or the machine is cleared. At all times during the forward motion of the carriage the shaft 94 is locked by the engagement of the slot 206 in the lower end of the arm 207, that is fixed to the said shaft 94, with a stationary pin 208 projecting from the wall of the casing. During the reverse movement of the carriage, (except when the machine is being cleared) the shaft 94 is locked by the engagement of the flat projection 200 on the gear 199 with the under side of the shaft 201.

When it is desired to return the total wheels to zero, the yokes 109 must be raised so as to disengage said wheels. The device for raising the yokes is as follows: The pin or rod 110 passes through slots 110' in the side walls of the housing and projects into an inclined slot in a plate 102 that has its lower end secured to a rock-shaft 103 that passes transversely through the housing. One of these plates 102 is secured to each end of the rock-shaft 103. One of the plates 102 has a projecting lug 103' carrying a pin 103" and this pin is adapted to engage an L-shaped slot in a disk 199' that turns with the gear 199. When the total wheels are in engagement with the item wheels the pin 103" is in the vertical part of the slot (see Fig. 31.) When the total wheels are raised the pin is opposite the horizontal part of the slot (see Fig. 28) and as the gear turns the pin rides out of the slot on to the periphery of the disk, thereby turning the plates 102 (into the position shown in Fig. 30) and the rock-shaft 103 and raising the rod 110 and with it all of the yokes 109 and releasing all of the total wheels from said yoke. The edge of the disk is provided with the stop 200' and when the gear 199 and the disk 199' have made one revolution the pin 103" drops back into the vertical part of the slot.

*The inking devices.*—While any suitable inking device, such as the inking ribbon usually employed upon typewriters, may be employed for inking the type, the inking devices shown in the drawings consist of inking rollers. For the purpose of inking the item wheels a series of felt rollers 209 are arranged upon a shaft 210 that is mounted in arms 211 pivotally supported on the shaft 90. A spring 212 normally holds the inking rollers directly in front of the type wheels (see Fig. 30) a pin 213 serving as a stop for the arms 211. Suitable spacing blocks are arranged between the rollers and the ends of the shaft 210 project beyond the arms 211 (see Figs. 13 and 16). Upon the inside of the casing at each side of the opening through which the type project when the impression is made on the paper, is an incline 214. When the carriage moves forward the ends of the shaft 210 engage these inclines and the inking roller 209 are moved upward into the position shown in Fig. 9 just before the type reach the paper. When the carriage moves backward these rollers are returned to their normal position by the action of the spring 212. While in their normal position, these rollers, which are charged with ink, are in contact with the type of the item wheels as said wheels rotate and thereby said type are suitably inked. For inking the total wheels a single inking roller 215 is employed mounted on a curved horizontal arm 216. This arm is pivoted upon a crank-arm 217 secured to the hub of the gear 189. A spring 218 engages the arm and tends to hold its free end in contact with the type of the total wheels. When the gear 189 is rotated the roller 215 is moved across the type upon the total wheels, and the type which are to print are inked. Usually the item wheels are inked with black or blue ink and the total wheels with red ink, so that the items are printed in black or blue and the totals in red.

The details of the mechanism may be varied in many particulars without departing from my invention. It will be seen that I provide an adding machine that is absolutely positive in all of its operations; that is simple in construction and that is not liable at any time to get out of order.

I claim as my invention:

1. The combination, with a key-board provided with a series of movable keys, of a reciprocating carriage, a series of type-wheels mounted upon said carriage, a transmitting mechanism actuated in the movement of said carriage by selected keys of said key-board, and means for supporting paper to be printed upon in the path of the movement of said type-wheels.

2. The combination, with a series of movable keys, of a reciprocating carriage, a series of type-wheels mounted upon said carriage, a transmitting mechanism actuated in the movement of said carriage by selected keys of said key-board, and a paper carriage arranged to hold paper to be printed upon in position to be impressed by said type-wheels as the carriage reaches the limit of its movement.

3. The combination, with a key-board provided with a row of independent keys numbered from 1 to 9, of a reciprocating carriage, a type-wheel mounted upon said carriage, an actuating device, whereby as said carriage is moved said type-wheel is rotated by engagement of said actuating device with any previously operated key of said row, and a paper carriage and support arranged to hold paper to be printed upon in position to be impressed by said type-wheel as the carriage reaches the limit of its movement.

4. The combination, with a key-board provided with a series of movable keys, of a reciprocating carriage, a series of type-wheels mounted on said carriage, a series of rack-bars also mounted upon said carriage and connected with said type-wheels, and adapted as said carriage is moved to engage previously operated keys of said key-board.

5. The combination, with a key-board provided with a row of independent keys numbered from 1 to 9, of a reciprocating carriage, a type-wheel mounted upon said carriage, a rack-bar also mounted upon said carriage, and connected with said type-wheel, whereby as said carriage is moved said type-wheel is rotated by engagement of said rack-bar with any previously operated key of said row.

6. The combination, with a key-board provided with a series of movable keys, of a reciprocating carriage, and type-wheels mounted thereon, rack-bars also mounted on said carriage and connected with said type-wheels and a suitable stop for said rack-bars whereby as said carriage is moved in one direction said type-wheels are rotated by engagement of said rack-bars with previously operated keys, and as said carriage is moved in the opposite direction said type-wheels are returned to their original position by engagement of said rack-bars with said stop.

7. The combination, with a key-board, provided with a row of independent keys numbered from 1 to 9, of a reciprocating carriage, a type-wheel mounted upon said carriage, a rack-bar also mounted upon said carriage and connected with said type-wheel, and a paper carriage arranged to support paper to be printed upon in the path of the movement of said type-wheel.

8. The combination, with a key-board provided with a series of rows of numbered keys, of a reciprocating carriage, type-wheels mounted upon said carriage, a series of rack-bars also mounted upon said carriage and connected with said type-wheels, whereby as said carriage is moved in one direction said type-wheels are moved by engagement of said rack-bars with previously operated keys, and means for recording the numbers registered on said type-wheels at each movement of said carriage.

9. The combination, with a reciprocating carriage, and type-wheels mounted thereon, of means for operating said wheels the same distance in both directions as said carriage is reciprocated, and means for supporting paper to be printed upon in the path of the movement of said type-wheels.

10. The combination, with a key-board provided with a series of movable keys, of a reciprocating carriage, type-wheels mounted upon said carriage, rack-bars also mounted upon said carriage and connected with said type-wheels, and adapted to engage previously operated keys, and means for locking the rack-bars to the operated keys.

11. The combination, with a key-board provided with a series of movable keys, of a reciprocating carriage, type-wheels mounted upon said carriage, rack-bars also mounted upon said carriage and connected with said type-wheels, and adapted to engage the previously operated keys, and means for locking the rack-bars to the operated keys during the forward movement of the carriage and releasing them at the end of such movement.

12. The combination, with a key-board and keys, of the reciprocating carriage, the item type-wheels and the total type-wheels mounted thereon, means for causing the total wheels to mesh with the item wheels during one movement of the carriage, and holding them out of mesh during the return movement.

13. The combination with the key-board and keys, of the reciprocating carriage, the item type-wheels and the total type-wheels mounted thereon, means operated by said keys for rotating said item wheels, and means for moving said total wheels into and out of engagement with said item wheels.

14. The combination, with the item type-wheels, and means for alternately showing amounts thereon and returning said wheels to zero, of the total type-wheels, and means for moving said total wheels into and out of engagement with said item wheels.

15. The combination, with the key-board and keys, of the reciprocating carriage, the item type-wheels, and the total type-wheels mounted thereon, means for operating said item wheels the same distance in both directions as said carriage is reciprocated, and means for causing the total wheels to mesh with the item wheels during one movement of the carriage, and holding them out of mesh during the return movement.

16. The combination, with the key-board, the keys, the reciprocating carriage, and the type-wheels on said carriage, of the vertically movable paper-carriage.

17. The combination, with the key-board, the keys, the reciprocating carriage and the type-wheels on said carriage, of the vertically movable paper-carriage, and means operated by the movements of the reciprocating-carriage for raising and lowering said paper-carriage.

18. The combination, with the key-board, the keys, the reciprocating carriage, and the type-wheels on said carriage, of the vertically movable paper-carriage, the feed-rolls and means for operating said feed-rolls in either position of said paper-carriage.

19. The combination, with the key-board, the keys, the reciprocating carriage and the type-wheels on said carriage, of the laterally adjustable paper-carriage arranged to hold paper in position to be impressed by said type-wheels.

20. The combination, with the key-board, the keys, the reciprocating carriage and the two sets of type-wheels on said carriage, of the vertically movable and laterally adjustable paper-carriage.

21. The combination, with the key-board, the keys, the reciprocating carriage, and the two sets of type-wheels on said carriage, of the vertically movable and laterally adjustable paper carriage, the feed-rolls on said paper-carriage, and means for operating the feed-rolls in any position of the paper-carriage.

22. The combination, with the key-board and keys, of the reciprocating carriage, the item type-wheels and the total type-wheels mounted thereon, means operated by said keys for causing said item wheels to roate as said carriage is moved in one direction, and means for causing the total type-wheels to mesh with the item wheels during one movement of the carriage and to hold them out of mesh during the return movement.

23. The combination, with the key-board and keys, of the reciprocating carriage, the item type-wheels and the total type-wheels mounted thereon, means operated by said keys for causing said item-wheels to rotate as said carriage is moved in one direction, means for causing the total type-wheels to mesh with the item wheels during one movement of the carriage and to hold them out of mesh during the return movement, and means for supporting paper to be printed on in position to be impressed by either set of wheels.

24. The combination, with the reciprocating carriage, of the item type-wheels and the total type-wheels mounted thereon, means for moving the total-wheels into and out of mesh with the item wheels, and means for restoring the total wheels to zero.

25. The combination, with the reciprocating carriage, of the item type-wheels and the total type-wheels mounted thereon, means for moving the total-wheels into mesh with the item-wheels during the forward movement of the carriage and moving them out of mesh during its backward movement, and means for returning the total wheels to zero during said backward movement.

26. The combination, with the item-wheels, of the total-wheels, the reciprocating carriage, the shaft 94 upon which said total wheels are mounted, the vertically sliding blocks 95, and the swinging yoke 97 for raising and lowering said blocks, said total wheels being capable of movement into mesh with the item wheels during the forward movement of the carriage, and out of mesh during the backward movement.

27. The combination, with the reciprocating carriage, of the housing 88, the shaft 90 bearing the item wheels 87 mounted in said housing, and the shaft 94 mounted in the movable blocks 95, and bearing the total wheels 93.

28. The combination, with the reciprocating carriage, of the housing 88, the shaft 90 bearing the item wheels 87 mounted in said housing, the shaft 94 mounted in the movable blocks 95 and bearing the total wheels 93, and the swinging yoke 97 for raising and lowering said shaft 94 and blocks 95, and bringing the total wheels out of or into mesh with the item wheels.

29. The combination, with the reciprocating carriage, of the housing 88, the shaft 90 bearing the item wheels 87 mounted in said housing, the shaft 94 mounted in the movable blocks 95 and bearing the total wheels 93, means for carrying from one of said total wheels to another, and the swinging yoke 97 for raising and lowering said total wheels.

30. The combination, with the reciprocating carriage, of the item type wheels and the total type-wheels mounted on said carriage, the star-wheels in proximity to said total-wheels, and means for moving said star-wheels and thereby carrying from one of said total-wheels to the next.

31. The combination, with the reciprocating carriage, of the item type-wheels, and the total type-wheels mounted on said carriage, the star-wheels in proximity to said total wheels, and the stationary teeth 116 arranged above said star-wheels.

32. The combination, with the reciprocating carriage, of the item type-wheels and the total type-wheels mounted on said carriage, the star-wheels arranged in proximity to said total wheels, means for raising and lowering the total wheels and star wheels, and the stationary teeth 116 in position to engage the star-wheels when in their elevated position.

33. The combination, with the reciprocating carriage, of the item wheels and the total wheels mounted on said carriage, means for moving the total-wheels into and out of engagement with the item wheels, the star-wheels arranged in proximity to said total-wheels, and the stationary teeth arranged above said star-wheels.

34. The combination, with the reciprocating carriage, of the item wheels and the total wheels mounted on said carriage, means for moving the total wheels into and out of engagement with the item wheels, the star-wheels 106, and the diagonal bar 115, provided with the teeth 116.

35. The combination, with the reciprocating carriage and the type-wheels mounted thereon, of the printing roller, and means for setting back beyond the printing line the type of the wheels that are not to print.

36. The combination, with the reciprocating carriage, and the item type-wheels mounted thereon, of the shaft supporting said wheels and provided with an eccentric section, and means for moving said shaft through said wheels.

37. The combination, with the key-board and keys, of the reciprocating carriage, the item type-wheels mounted thereon, the shaft supporting said wheels, and provided with an eccentric section, and means governed by the previously operated keys for moving said shaft through said type-wheels.

38. The combination, with the key-board and keys, of the reciprocating carriage, the item type-wheels, the shaft 90 having an eccentric section and supporting said type-wheels, the printing roller, and means governed by the previously operated keys for moving said shaft through said type-wheels and moving the wheels that are not to print back from the printing line.

39. The combination, with the key-board and keys, of the reciprocating carriage, the type-wheels mounted thereon, the power-operated gear, and means for moving the said power operated gear into engagement with means for moving said carriage.

In testimony whereof, I have hereunto set my hand this 28th day of December, 1904.

WILLIAM P. SHATTUCK.

In presence of—
C. G. HANSON,
A. C. PAUL.

Copies of this patent may be obtained for five cents each, by addressing the "Commissioner of Patents, Washington, D. C."